United States Patent
Suzuki et al.

(10) Patent No.: US 11,526,172 B2
(45) Date of Patent: Dec. 13, 2022

(54) MOBILE OBJECT CONTROL APPARATUS AND MOBILE OBJECT CONTROL METHOD

(71) Applicant: SONY CORPORATION, Tokyo (JP)

(72) Inventors: Ryuichi Suzuki, Tokyo (JP); Kentaro Ida, Tokyo (JP); Hidehiro Komatsu, Tokyo (JP); Chikako Tateishi, Tokyo (JP); Yuto Ishizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,181

(22) PCT Filed: Jun. 6, 2019

(86) PCT No.: PCT/JP2019/022453
§ 371 (c)(1),
(2) Date: Dec. 10, 2020

(87) PCT Pub. No.: WO2019/244644
PCT Pub. Date: Dec. 26, 2019

(65) Prior Publication Data
US 2021/0255630 A1   Aug. 19, 2021

(30) Foreign Application Priority Data
Jun. 19, 2018 (JP) .............................. JP2018-116123

(51) Int. Cl.
*G05D 1/02* (2020.01)

(52) U.S. Cl.
CPC .................................. *G05D 1/0212* (2013.01)

(58) Field of Classification Search
CPC ............................... G05D 1/0212; G05D 1/02
(Continued)

(56) References Cited

U.S. PATENT DOCUMENTS 9,594,376 B2 * 3/2017 Larsson ................. B60W 30/10
10,776,733 B2 * 9/2020 Hunsaker ........... G06Q 10/0639
(Continued)

FOREIGN PATENT DOCUMENTS

CN    107111317 A    8/2017
JP    2006-035381 A    2/2006
(Continued)

OTHER PUBLICATIONS

Takafumi Matsumaru, "The Human-Machine-Information System and the Robotic Virtual System", Journal of the Society of Instrument and Control Engineers, The Society of Instrument and Control Engineers, ISSN 0453-4662, <DOI:10.11499/sicejl1962.43.116>, vol. 43, No. 2, Feb. 10, 2004, pp. 116-121.
(Continued)

*Primary Examiner* — Yazan A Soofi
(74) *Attorney, Agent, or Firm* — Chip Law Group

(57) ABSTRACT

Provided are a mobile object control apparatus and a mobile object control method that provide an improved method of presenting a travel route during movement of the mobile object. A degree of relation with an individual in the vicinity of a mobile object is decided, and a travel mode that is associated with a process performed by a driving section that moves the mobile object and a process performed by an output section that outputs a representation for presenting a travel route of the mobile object is set on the basis of the degree of relation.

11 Claims, 39 Drawing Sheets

(58) Field of Classification Search
 USPC .......................................................... 701/25
 See application file for complete search history.

(56) References Cited

U.S. PATENT DOCUMENTS

| | | | | |
|---|---|---|---|---|
| 2006/0058921 | A1* | 3/2006 | Okamoto | G05D 1/0272 |
| | | | | 701/25 |
| 2008/0147261 | A1* | 6/2008 | Ichinose | G01C 22/006 |
| | | | | 901/1 |
| 2015/0160654 | A1* | 6/2015 | Nakamura | G05D 1/024 |
| | | | | 701/23 |
| 2017/0357264 | A1* | 12/2017 | Watanabe | G06V 20/58 |
| 2021/0255630 | A1* | 8/2021 | Suzuki | G05D 1/0214 |

FOREIGN PATENT DOCUMENTS

| | | |
|---|---|---|
| JP | 2008-152504 A | 7/2008 |
| JP | 2010-055422 A | 3/2010 |
| JP | 2011-204145 A | 10/2011 |
| JP | 2013-107184 A | 6/2013 |
| JP | 5901753 B2 | 4/2016 |
| JP | 6388141 B2 | 9/2018 |
| KR | 10-2008-0056669 A | 6/2008 |
| WO | 2013/171905 A1 | 11/2013 |
| WO | 2016/104265 A1 | 6/2016 |

OTHER PUBLICATIONS

Takafumi Matsumaru, "Evaluation Experiment in Simulated Interactive Situation between People and Mobile Robot with Preliminary-Announcement and Indication Function of Upcoming Operation", The Transactions of Human Interface Society, Human Interface Society, ISSN 1344-7262, vol. 10, No. 1, 2008, pp. 11-20. (Translation of Abstract Only).
International Search Report and Written Opinion of PCT Application No. PCT/JP2019/022453, issued on Aug. 27, 2019, 10 pages of ISRWO.

* cited by examiner

FIG. 6

| TRAVEL PATTERN | BY REPRESENTATION | | | BY DRIVING | APPLICABLE TRAVEL MODE |
|---|---|---|---|---|---|
| | DIRECTION OF TRAVEL | DIRECTION CHANGE | DIRECTION CHANGE | | |
| A | — | — | — | — | 3 |
| B | — | — | — | ○ | 1 |
| C | ○ | — | — | ○ | 1 |
| D | ○ | — | ○ | — | 2 |
| E | ○ | ○ | ○ | ○ | 2 |

PASSAGE A

PASSAGE B

FIG.9
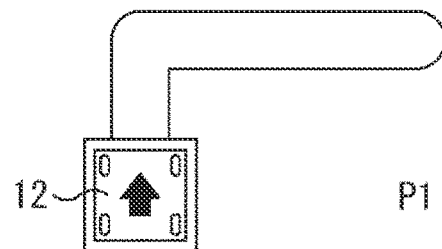
P1
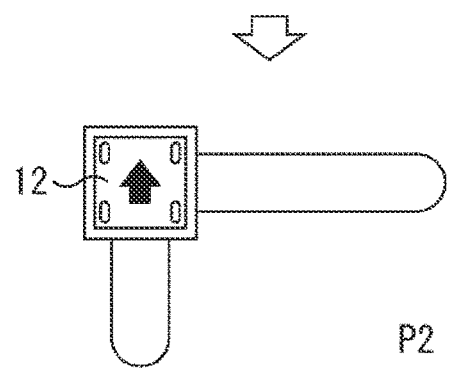
P2
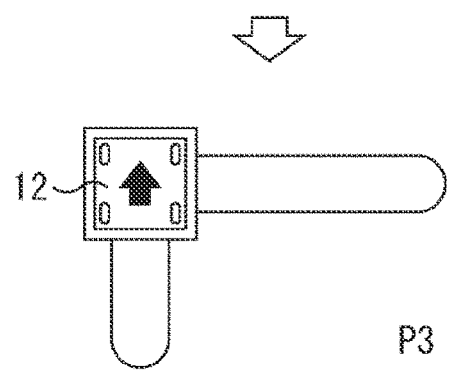
P3
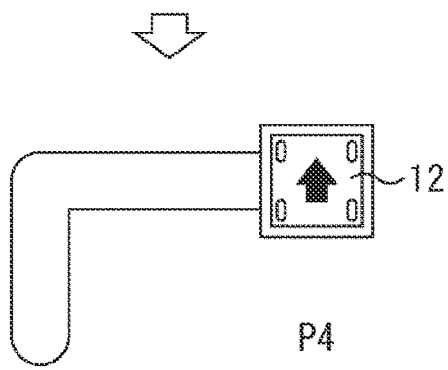
P4

FIG.11
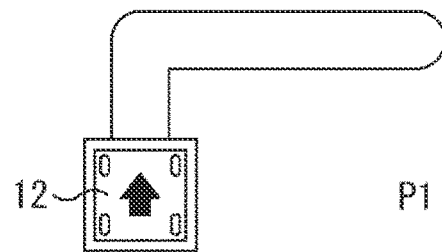
P1
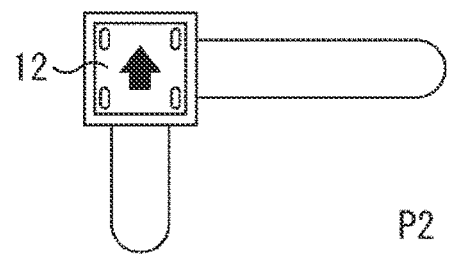
P2
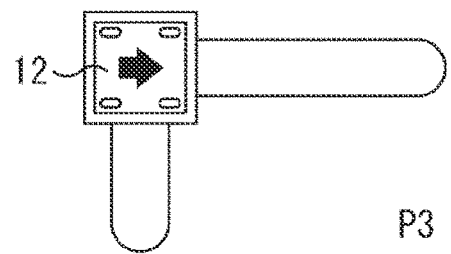
P3
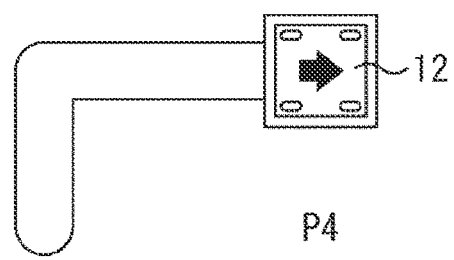
P4

FIG.14
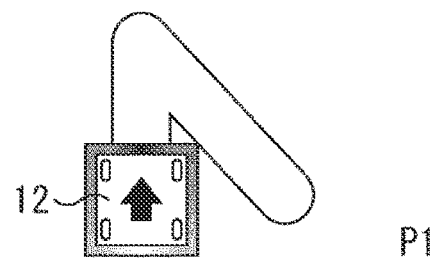
P1
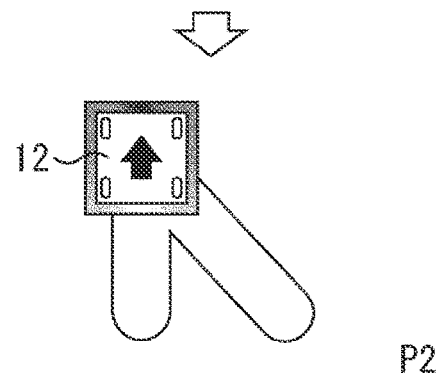
P2
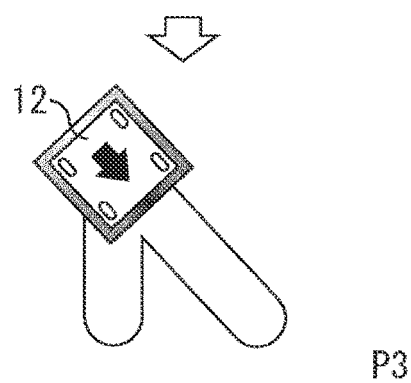
P3
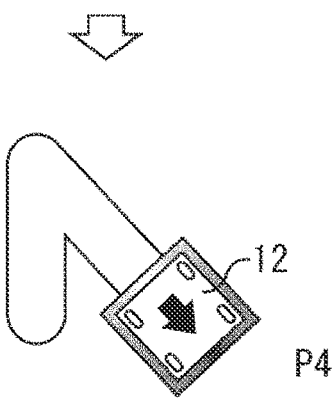
P4

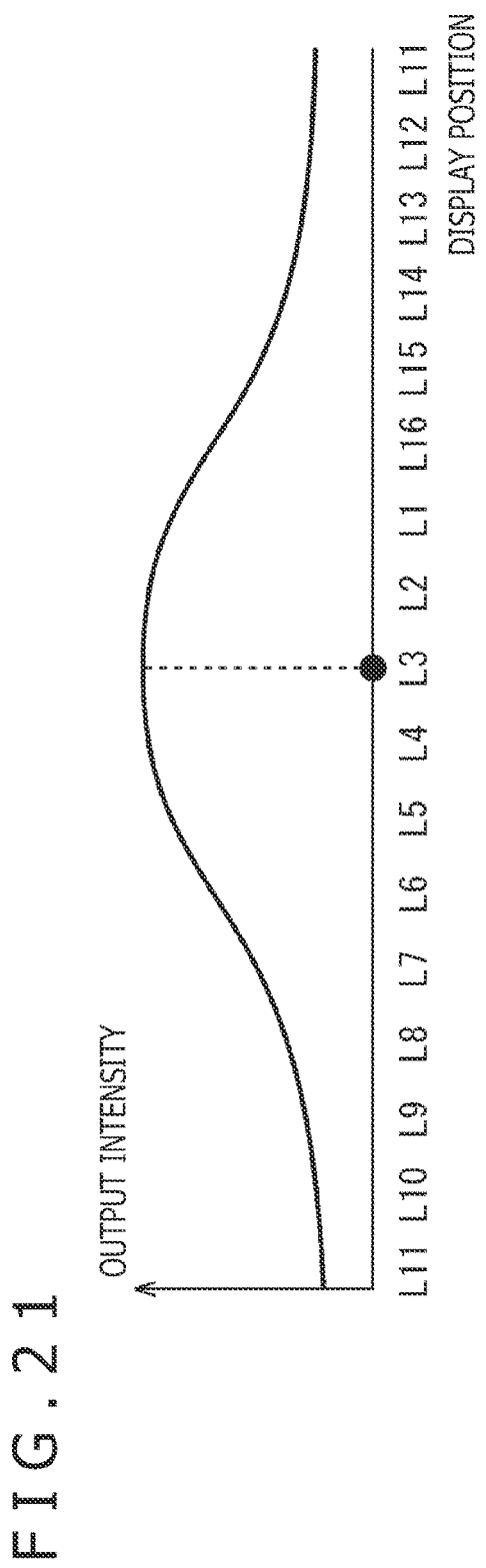

FIG. 23

| REPRESENTATION / BRIGHT SPOT | BOUNDS | | SHADING/BRIGHTNESS | HUE | FLASHING |
|---|---|---|---|---|---|
| ONE BRIGHT SPOT | DIRECTION OF TRAVEL ONLY | HALF CIRCUMFERENCE | DARK ON FRONT WITH LUMINANCE REDUCED GRADUALLY | CHANGE HUE OVER ENTIRE CIRCUMFERENCE (RED → YELLOW → GREEN) | CHANGE LOWER LIMIT BRIGHTNESS FOR FLASHING OVER ENTIRE CIRCUMFERENCE |
| FACE-BY-FACE | WIDER ON FRONT | FRONT AND REAR FACES ONLY | CHANGE GRADATION FOR EACH FACE | CHANGE HUE FOR EACH FACE (RED → YELLOW → GREEN) | CHANGE FLASHING INTERVAL AND LOWER LIMIT BRIGHTNESS FOR EACH FACE |
| PLURAL BRIGHT SPOTS WITHIN FACE | 4 FACES | 2 FACES | CHANGE GRADATION FOR EACH BRIGHT SPOT | CHANGE HUE ON CIRCUMFERENCE FOR EACH BRIGHT SPOT (RED → YELLOW → GREEN) | CHANGE FLASHING INTERVAL AND LOWER LIMIT BRIGHTNESS FOR EACH FACE |

FIG.37
STANDBY
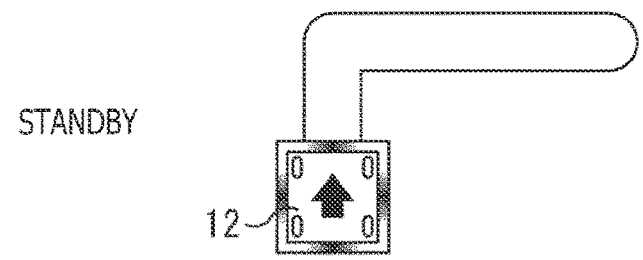
PRESENTS DIRECTION OF
TRAVEL WHILE AT HALT
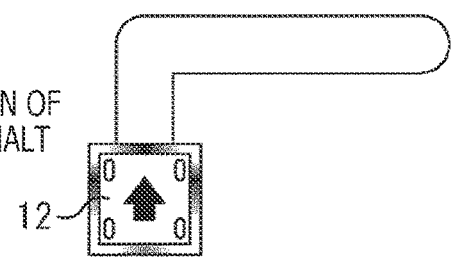
TRAVELING
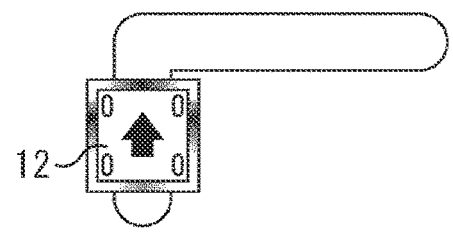
HALT
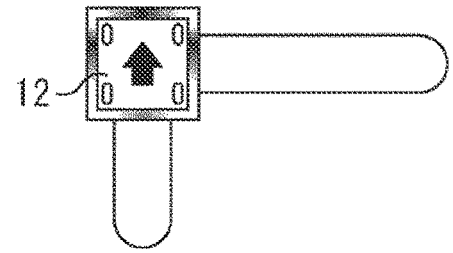

FIG.38
TURN DIRECTION
OF TRAVEL
WHILE AT HALT
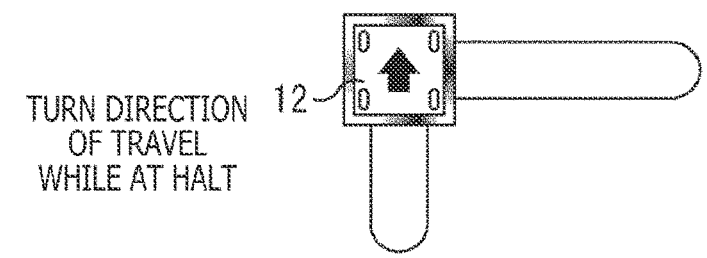
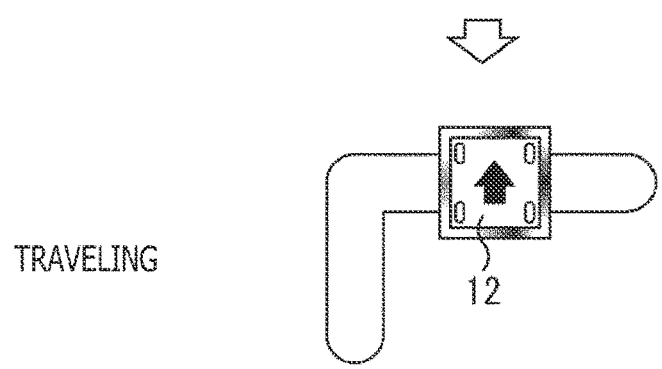
TRAVELING
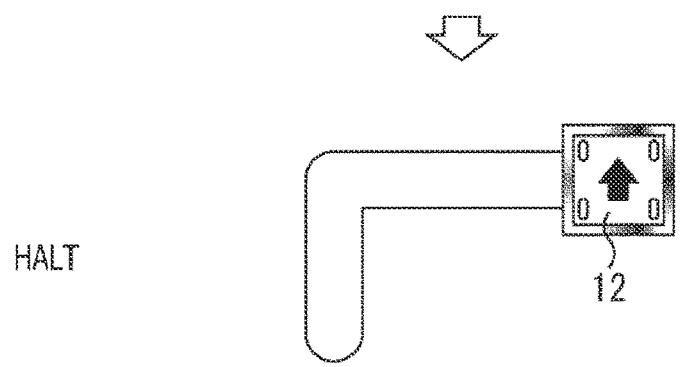
HALT
PRESENT DIRECTION OF
INTEREST EVEN AFTER
COMING TO HALT
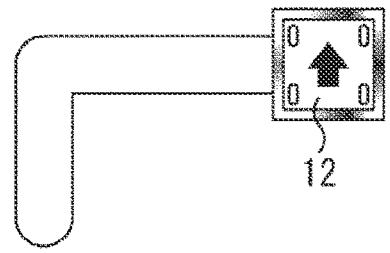

MOBILE OBJECT CONTROL APPARATUS AND MOBILE OBJECT CONTROL METHOD

CROSS REFERENCE TO RELATED APPLICATIONS

This application is a U.S. National Phase of International Patent Application No. PCT/JP2019/022453 filed on Jun. 6, 2019, which claims priority benefit of Japanese Patent Application No. JP 2018-116123 filed in the Japan Patent Office on Jun. 19, 2018. Each of the above-referenced applications is hereby incorporated herein by reference in its entirety.

TECHNICAL FIELD

The present disclosure relates to a mobile object control apparatus, a mobile object control method, and a program, and particularly, to a mobile object control apparatus, a mobile object control method, and a program that provide an improved method of presenting a travel route during movement of the mobile object.

BACKGROUND ART

In recent years, it has been predicted that movement of robots and other mobile objects will become commonplace in human living environments. Under such circumstances, what is currently under study is to alert individuals in the vicinity of a mobile object by properly presenting its travel route during movement of the mobile object.

For example, PTL 1 proposes a mobile apparatus that can recognize a distance to an individual in the vicinity and use a direction instruction section to present a travel route such that the shorter the distance to the individual, the more detailed the presented travel route.

CITATION LIST

Patent Literature

[PTL 1]
JP 2011-204145A

SUMMARY

Technical Problems

Incidentally, as disclosed in PTL 1, the method of presenting a travel route on the basis of the distance to the individual in the vicinity during movement of the mobile object may present a travel route irrelevant to a behavior of the individual. For this reason, depending on the behavior of the individual in the vicinity of the mobile object, there is a possibility that the individual cannot properly recognize the movement of the mobile object, and there is thus a demand to provide an improved method of presenting a travel route.

The present disclosure has been devised in light of the foregoing, and it is an object of the present disclosure to provide an improved method of presenting a travel route during movement of a mobile object.

Solution to Problems

A mobile object control apparatus of an aspect of the present disclosure includes a degree-of-relation deciding section and a setting section. The degree-of-relation deciding section decides a degree of relation with an individual in the vicinity of a mobile object. The setting section sets a travel mode associated with a process performed by a driving section that moves the mobile object and a process performed by an output section that outputs a representation for presenting a travel route of the mobile object, on the basis of the degree of relation.

A mobile object control method of an aspect of the present disclosure includes, by a mobile object control apparatus that controls movement of a mobile object, deciding a degree of relation with an individual in the vicinity of the mobile object and setting a travel mode associated with a process performed by a driving section that moves the mobile object and a process performed by an output section that outputs a representation for presenting a travel route of the mobile object, on the basis of the degree of relation.

A program of an aspect of the present disclosure causes a computer of a mobile object control apparatus that controls movement of a mobile object, to perform mobile object control including deciding a degree of relation with an individual in the vicinity of the mobile object and setting a travel mode associated with a process performed by a driving section that moves the mobile object and a process performed by an output section that outputs a representation for presenting a travel route of the mobile object, on the basis of the degree of relation.

In an aspect of the present disclosure, a degree of relation with an individual in the vicinity of a mobile object is decided, and a travel mode that is associated with a process performed by a driving section that moves the mobile object and a process performed by an output section that outputs a representation for presenting a travel route of the mobile object is set on the basis of the degree of relation.

Advantageous Effect of Invention

According to an aspect of the present disclosure, it is possible to provide an improved method of presenting a travel route during movement of the mobile object.

It should be noted that the advantageous effect described here is not necessarily limited and may be any one of the advantageous effects described in the present disclosure.

BRIEF DESCRIPTION OF DRAWINGS

FIG. 6 is a diagram describing a relation between a travel pattern and a travel mode.

FIG. 9 is a diagram illustrating an example of changing a travel route in a travel pattern A in a passage A.

FIG. 11 is a diagram illustrating an example of changing the travel route in a travel pattern B in the passage A.

FIG. 14 is a diagram illustrating an example of changing the travel route in the travel pattern C in the passage B.

FIG. 21 is a diagram describing a technique for calculating a display intensity based on a one-dimensional vector.

FIG. 23 is a diagram illustrating variations for displaying a direction of travel.

FIG. 37 is a diagram describing display control that performs representation of preliminary actions.

FIG. 38 is a diagram describing display control that performs representation of preliminary actions.

DESCRIPTION OF EMBODIMENT

A detailed description will be given below of a specific embodiment to which the present technology is applied, with reference to drawings.

Configuration Example of the Mobile Object Control System

Figure 1:
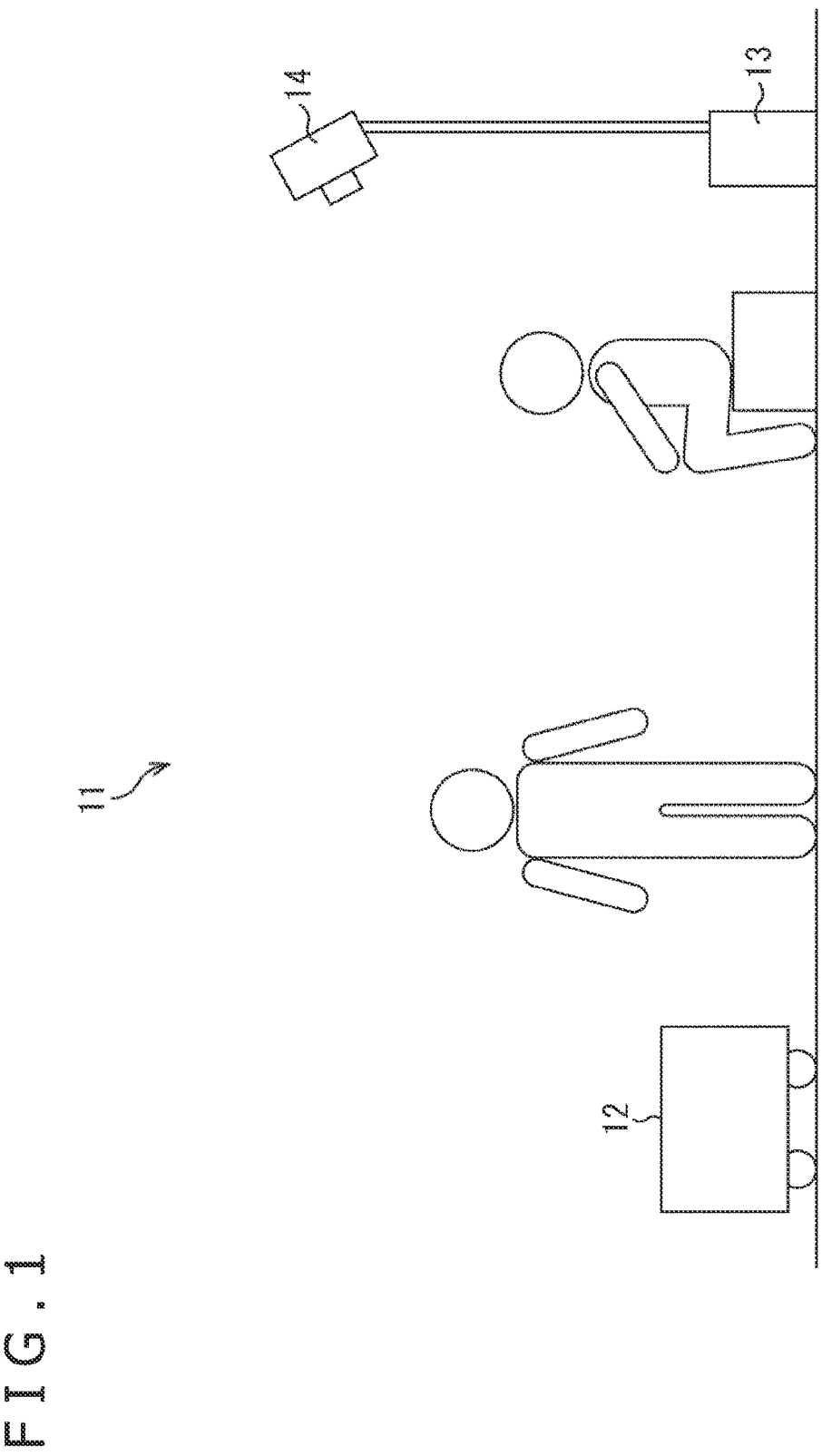
FIG. 1 is a diagram illustrating a configuration example of an embodiment of a mobile object control system to which the present technology is applied.

FIG. 1 is a diagram illustrating a configuration example of an embodiment of a mobile object control system to which the present technology is applied.

As illustrated in FIG. 1, a mobile object control system 11 includes an autonomous mobile robot 12, a processing apparatus 13, and a sensor module 14. For example, the mobile object control system 11 is designed keeping in mind its usage in human living environments, i.e., an environment in which plural individuals (two individuals, one standing and another sitting, in the example illustrated in FIG. 1) are present in the vicinity of the autonomous mobile robot 12.

The autonomous mobile robot 12 can move autonomously without being operated by an individual, by executing a program for moving in response to movement of an individual or a program for moving to any location away from an individual. Further, the autonomous mobile robot 12 includes a display section (refer to FIGS. 4A, 4B, and 4C), making it possible to present a travel route to the individuals in the vicinity during movement.

The processing apparatus 13 is fixedly provided in the environment where the autonomous mobile robot 12 is used and performs, for example, a process of controlling the movement of the autonomous mobile robot 12 on the basis of inputs from various sensors available with the autonomous mobile robot 12 or inputs from the sensor module 14.

The sensor module 14 is fixedly provided in the environment where the autonomous mobile robot 12 is used and senses, for example, various kinds of information required for the processing apparatus 13 to control the movement of the autonomous mobile robot 12, to input such information to the processing apparatus 13.

It should be noted that the configuration example of the mobile object control system 11 illustrated in FIG. 1 is merely an example, and the mobile object control system 11 can, for example, adopt a configuration in which the processing apparatus 13 and the sensor module 14 are incorporated in the mobile object control system 11. In addition to the above, the mobile object control system 11 can adopt a configuration in which the processing apparatus 13 and the sensor module 14 are provided as wearable devices that can be attached to a hand, a head, or a torso of an individual.

Configuration Example of the Autonomous Mobile Robot

A configuration example of the autonomous mobile robot 12 will be described with reference to FIGS. 2, 3, 4A, 4B, and 4C.

Figure 2:
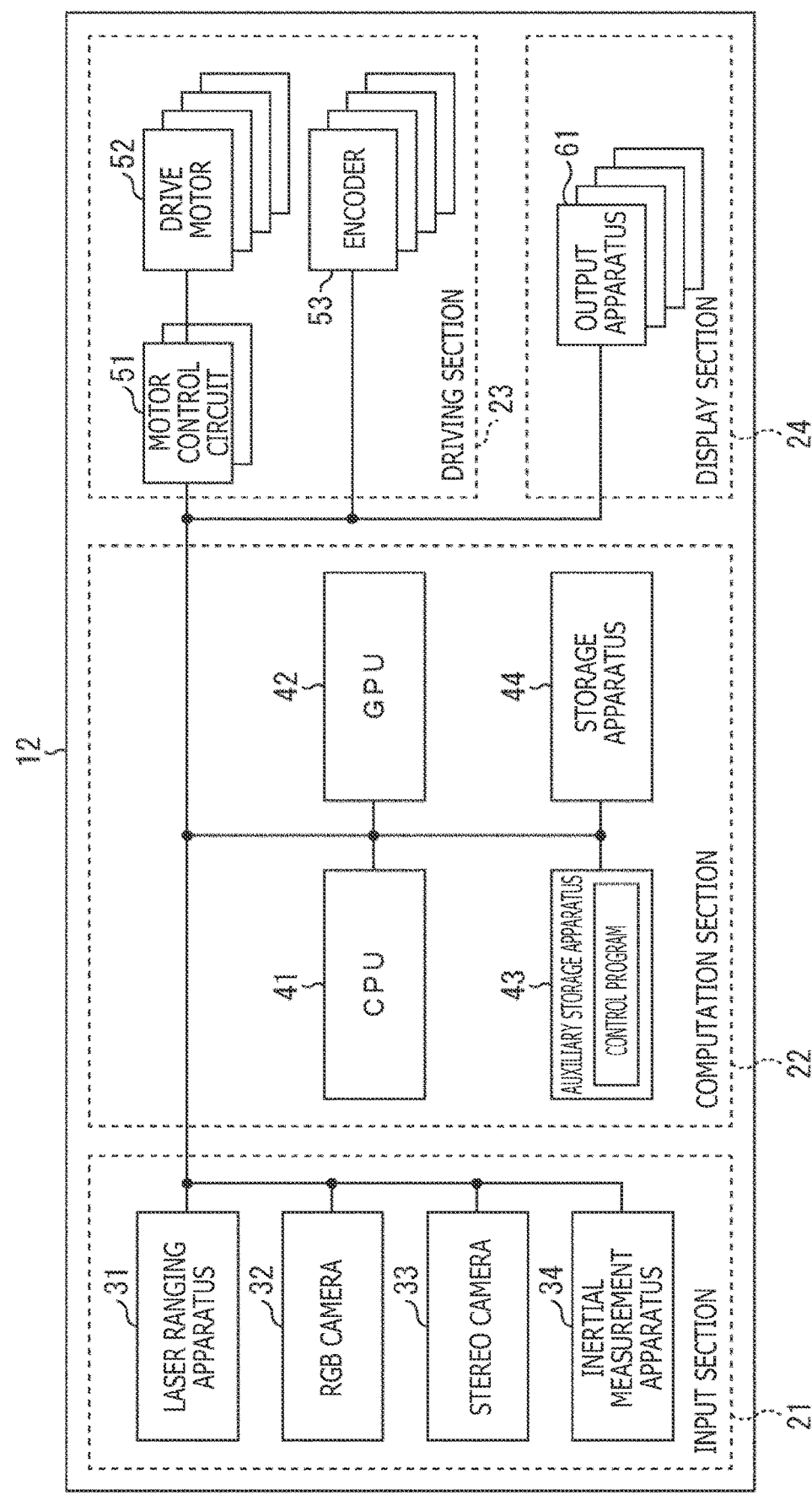
FIG. 2 is a hardware block diagram illustrating a configuration example of an autonomous mobile robot.

FIG. 2 is a hardware block diagram illustrating a configuration example of the autonomous mobile robot 12.

As illustrated in FIG. 2, the autonomous mobile robot 12 includes an input section 21, a computation section 22, a driving section 23, and a display section 24.

The input section 21 is used to receive information inputs from outside the autonomous mobile robot 12 and includes a laser ranging apparatus 31, an RGB camera 32, a stereo camera 33, and an inertial measurement apparatus 34.

The laser ranging apparatus 31 applies laser beams toward the vicinity of the autonomous mobile robot 12 and detects reflected beams of the laser beams applied, thus measuring the distance to an object in the vicinity and acquiring ranging information indicating the distance to the measured object.

The RGB camera 32 includes, for example, an imaging element having color filters or the like and acquires an RGB image by imaging the vicinity of the autonomous mobile robot 12.

The stereo camera 33 acquires two images by imaging the vicinity of the autonomous mobile robot 12 with two imaging elements, acquiring a distance image representing the distance to a subject appearing in the image, on the basis of parallax between the images.

The inertial measurement apparatus 34 includes, for example, a gyro sensor or the like, measuring angles and acceleration of three axes arising from the movement of the autonomous mobile robot 12 and acquiring measurement results thereof as inertial measurement information.

The input section 21 is configured as described above and supplies input information (i.e., ranging information, RGB image, distance image, and inertial measurement information) acquired from the laser ranging apparatus 31, the RGB camera 32, the stereo camera 33, and the inertial measurement apparatus 34 to the computation section 22.

It should be noted that the input section 21 may include a LIDAR (Light Detection and Ranging, Laser Imaging Detection and Ranging) or other ranging sensor for grasping the surrounding environment and obstacles, a depth sensor, or the like or a thermo camera for recognizing an individual by his or her body temperature. Further, the input section 21 may include a sound pickup apparatus for picking up surrounding sounds, thus making it possible to recognize, by audio, the direction in which an individual is present. Also, plural sensor modules (e.g., sensor module 14 in FIG. 1) can be provided in the environment where the autonomous mobile robot 12 is used, to carry out various sensing tasks such that the input section 21 communicates with these sensor modules.

The computation section 22 is used to control the driving section 23 and the display section 24 according to computations based on external information input via the input section 21 and includes a CPU 41, a GPU 42, an auxiliary storage apparatus 43, and a storage apparatus 44.

The CPU (Central Processing Unit) 41 reads out a control program stored in the auxiliary storage apparatus 43 for execution. Then, the CPU 41 refers to ranging information and inertial measurement information supplied from the input section 21, various kinds of information stored in the storage section 44, results of real-time image processing by the GPU 42, and the like, thus performing a mobile object control process (refer to the flowchart in FIG. 5) to carry out control related to movement and display of the autonomous mobile robot 12.

The GPU (Graphics Processing Unit) 42 subjects the RGB image and the distance image supplied from the input section 21 to image processing on a real time basis (one by one as supply arises) for recognizing individuals present in the vicinity of the autonomous mobile robot 12, supplying processing results thereof to the CPU 41.

The auxiliary storage apparatus 43 includes, for example, a RAM (Random Access Memory), reading out the control program from the storage apparatus 44 for storage.

The storage apparatus 44 includes, for example, an EEPROM (Electronically Erasable and Programmable Read Only Memory), storing the control program to be executed by the CPU 41 and various kinds of information required for the CPU 41 to perform the mobile object control process.

The computation section 22 is configured as described above and carries out a variety of computations resulting from the movement of the autonomous mobile robot 12 on the basis of input information supplied from the input section 21, deciding a behavior plan of the autonomous mobile robot 12. Then, the computation section 22 can control the driving of the driving section 23 and the display on the display section 24 on the basis of this behavior plan.

Also, the computation section 22 accommodates the difference in behavior resulting from the type of the driving section 23 as will be described later. It should be noted that the computation section 22 is not limited to the configuration in which it is incorporated in the autonomous mobile robot 12 and can be, for example, fixedly provided in the environment where the autonomous mobile robot 12 is used as is the processing apparatus 13 in FIG. 1. This ensures downsizing of the autonomous mobile robot 12.

The driving section 23 is used to move the autonomous mobile robot 12 according to drive control carried out by the computation section 22 and includes plural motor control circuits 51, plural drive motors 52, and plural encoders 53.

The motor control circuits 51 control the drive motors 52 in such a manner as to behave based on drive control carried out by the computation section 22.

The drive motors 52 are driven based on control performed by the motor control circuits 51, realizing the movement of the autonomous mobile robot 12.

The encoders 53 detect drive information (e.g., revolutions per minute, rotation angle, rotational position) of the drive motors 52, feeding back that drive information to the computation section 22 to realize driving based on drive control carried out by the computation section 22.

Figure 3:
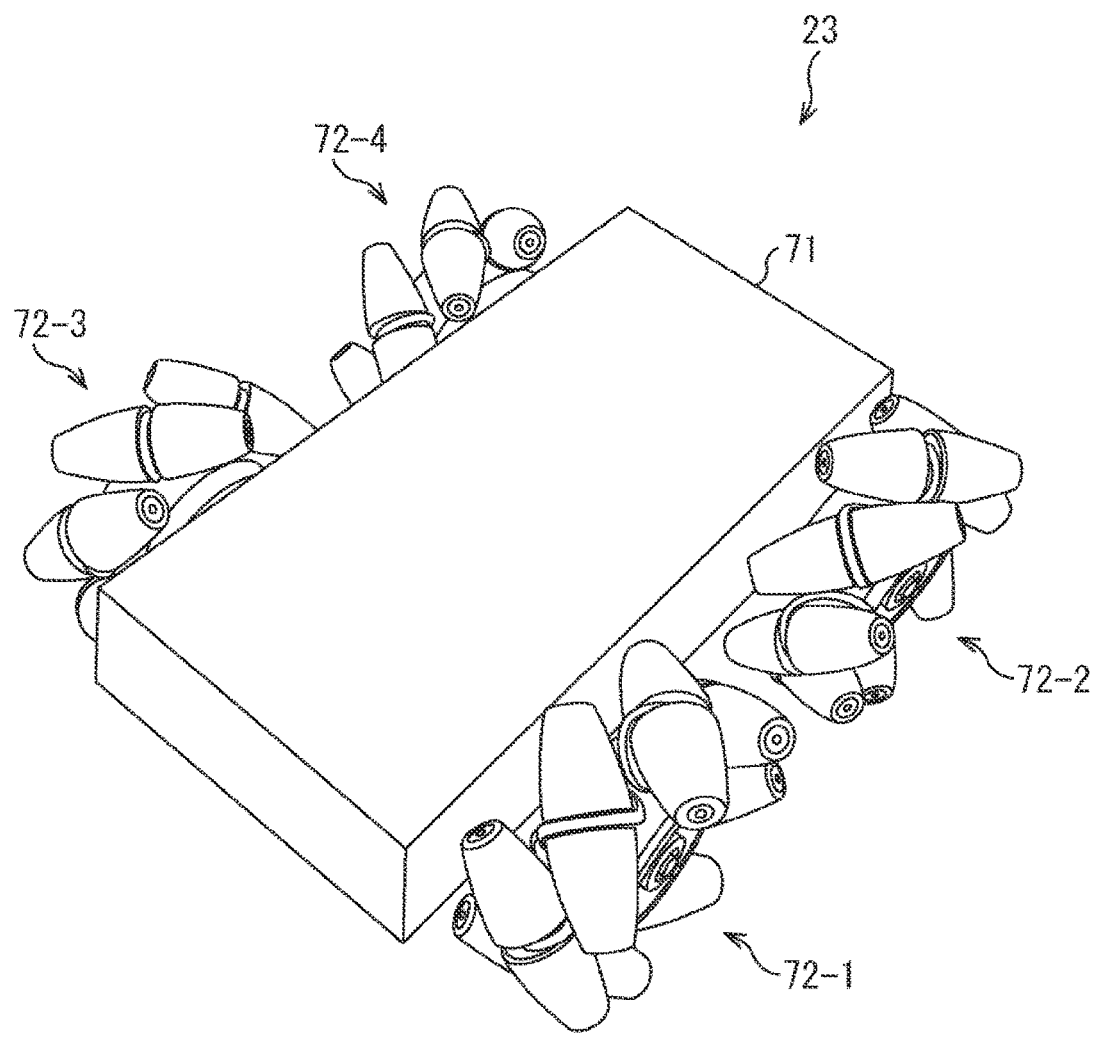
FIG. 3 is a diagram illustrating an example of mecanum wheels adopted as a driving section.

Here, the autonomous mobile robot 12 can adopt, as the driving section 23, mecanum wheels capable of moving in all directions. For example, as illustrated in FIG. 3, the driving section 23 can be configured such that four mecanum wheels 72-1 to 72-4 are fitted to a housing 7 incorporating the input section 21 and the computation section 22.

The mecanum wheels 72-1 to 72-4 are, for example, fitted to four locations, i.e. both front and rear side faces, of the housing 71, as is the case with ordinary automobiles. Plural rollers are rotatably attached to perimeters of the mecanum wheels 72-1 to 72-4, and rotating shafts of the rollers have given angles relative to rotating shafts (axles) of the mecanum wheels 72-1 to 72-4.

For example, the driving section 23 can move the housing 71 forward or rearward by driving the mecanum wheels 72-1 to 72-4 to rotate in the same direction. Also, the driving section 23 can turn the housing 71 by driving the mecanum wheels 72-1 and 72-2 and the mecanum wheels 72-3 and 72-4 to rotate in opposite directions. Then, the driving section 23 can move the housing 71 to the right or left without changing an orientation of the housing 71, by driving the mecanum wheels 72-1 and 72-3 and the mecanum wheels 72-2 and 72-4 to rotate in opposite directions. In addition to the above, the driving section 23 can move the housing 71 in any direction by properly controlling the rotation of the mecanum wheels 72-1 to 72-4.

It should be noted that the autonomous mobile robot 12 may adopt a variety of forms of driving other than the mecanum wheels 72-1 to 72-4 for the driving section 23. For example, a vehicle type robot, a multi-legged robot including bipedal robot, air-floating robot such as drone or hovercraft, a flying robot, and the like can be adopted as the autonomous mobile robot 12. Further, an underwater robot such as an ROV (Remotely operated vehicle) may be adopted as the autonomous mobile robot 12.

The display section 24 is used to present, to individuals present in the vicinity of the autonomous mobile robot 12, a travel route based on display control performed by the computation section 22 and includes plural output apparatuses 61.

For example, the output apparatuses 61 can include plural LEDs (Light Emitting Diodes), plural projectors, plural displays (e.g., liquid crystal panels, organic EL (Electro Luminescence) panels), and the like.

Figure 4A:
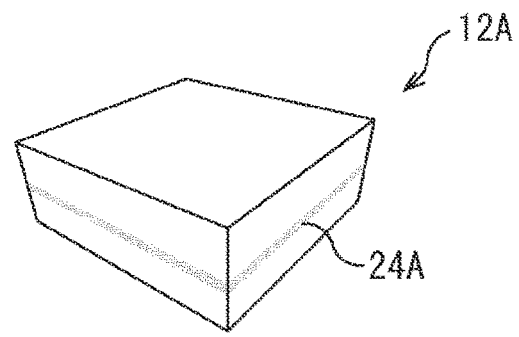
FIGS. 4A, 4B, and 4C depict diagrams illustrating various configuration examples of a display section.
Figure 4B:
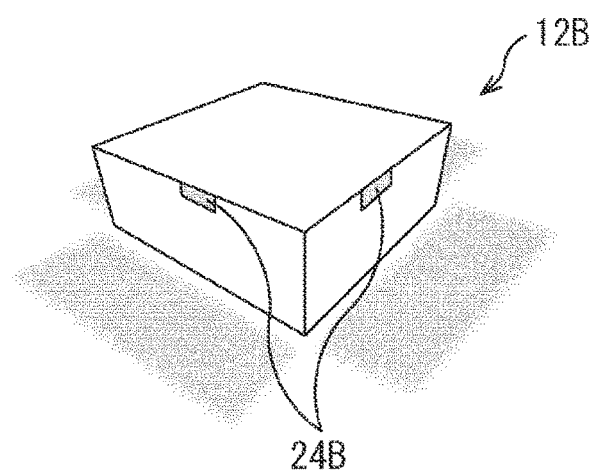
Figure 4C:
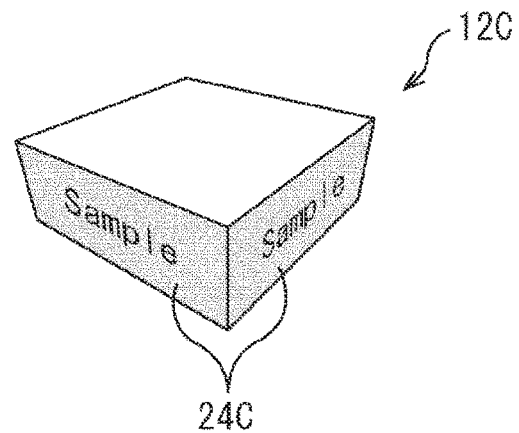

Here, FIGS. 4A, 4B, and 4C illustrate various configuration examples of the display section 24 that performs display over the entire perimeter of the side faces of the housing of the autonomous mobile robot 12 in the configuration having a square housing in plan view.

For example, as illustrated in A of FIG. 4A, a display section 24A includes plural LEDs arranged linearly along a circumferential direction on four faces of the housing of an autonomous mobile robot 12A. Also, as illustrated in FIG. 4B, a display section 24B includes projectors each provided to project video onto a surrounding floor from one of four side faces of the housing of an autonomous mobile robot 12B. Also, as illustrated in FIG. 4C, a display section 24C includes displays each incorporated in one of four side faces of the housing of an autonomous mobile robot 12C as such.

In addition to the above, the display section 24 may include a projector for projecting video onto a side face of the housing of the autonomous mobile robot 12 or plural LEDs arranged three-dimensionally on a side face of the housing of the autonomous mobile robot 12. Also, the display section 24 may be provided on a top face of the housing of the autonomous mobile robot 12. Further, the housing of the autonomous mobile robot 12 may be not only planar but also roundish such that the display section 24 includes point light sources such as LED array arranged one-dimensionally.

Further, in the configuration using projectors as the display section 24, in addition to using as many projectors as the number of side faces of the housing of the autonomous mobile robot 12, a fish-eye lens or the like may be used for a single projector to display an image in an enlarged size. Also, a projector capable of being driven on two axles may be installed to the housing of the autonomous mobile robot 12, thus projecting video in a required direction.

Also, as long as the objective of presenting a travel route to the individuals in the vicinity of the autonomous mobile robot 12 is accomplished, the display section 24 may not be mounted to the autonomous mobile robot 12. In other words, a projection apparatus such as a projector may be provided in the environment where the autonomous mobile robot 12 is used (for example, position of the sensor module 14 in FIG. 1), to project video. Alternatively, an individual may wear AR (Augmented Reality) glasses, i.e. a wearable terminal, that display video in a manner superimposed on a real space, thus displaying the video on the AR glasses.

In addition to the above, not only video but also audio may be used as output means of the autonomous mobile robot 12. For example, a configuration that presents a travel route to individuals by way of audio from a speaker may be adopted. For example, in a situation where representation of video by the display section 24 alone is insufficient for individuals in the vicinity of the autonomous mobile robot 12 to be aware of the travel route, it is effective to use audio as well as video.

The autonomous mobile robot 12 is configured as described above, and the computation section 22 performs the mobile object control process, thus controlling the driving of the driving section 23 and display on the display section 24. Then, in the mobile object control process, the computation section 22 can set a travel mode applied during movement of the autonomous mobile robot 12, according to a degree of relation between the autonomous mobile robot 12 and an individual in the vicinity of the autonomous mobile robot 12 (hereinafter referred to as a surrounding individual).

For example, the computation section 22 decides the degree of relation on the basis of a determination as to whether or not the autonomous mobile robot 12 is moving together with a surrounding individual and whether or not a surrounding individual who can visually recognize the autonomous mobile robot 12 is present. Here, the term "degree of relation" refers to information used to decide the behavior of the autonomous mobile robot 12 on the basis of the relation between the autonomous mobile robot 12 and the surrounding individual (e.g., presence or absence of a surrounding individual and details of behavior of the autonomous mobile robot 12). For example, the closer the relation between the autonomous mobile robot 12 and the surrounding individual, the higher the degree of relation, and the more irrelevant the autonomous mobile robot 12 and the surrounding individual, the lower the degree of relation.

Then, the computation section 22 sets a travel mode that permits the movement of the autonomous mobile robot 12 and the presentation of a travel route such that the higher the degree of relation with the surrounding individual, the better the sense of security felt by the surrounding individual. As a result, even when the autonomous mobile robot 12 is used in a human living environment, surrounding individuals can properly recognize the movement of the autonomous mobile robot 12, thus providing a higher level of operational safety.

Also, the autonomous mobile robot 12 employs the mecanum wheels 72 as illustrated in FIG. 3, thus making it possible to change its direction of travel without being constrained by the direction of the housing. The fact that there is no constraint on the direction of travel as described above prevents the surrounding individual from knowing in advance the direction of travel and the direction of interest of the autonomous mobile robot 12. For this reason, in the case where the autonomous mobile robot 12 is used in a human living environment, the sense of security will probably decline. However, by setting an appropriate travel mode according to the degree of relation with the surrounding individual as described above, it is possible to avoid such a decline in sense of security.

Also, the autonomous mobile robot 12 can present a travel route not only forward thereof but also sideways or rearward thereof if the display section 24 is provided on all side faces of the housing of the autonomous mobile robot 12 as illustrated in FIGS. 4A, 4B, and 4C.

<Mobile Object Control Process>

Figure 5:
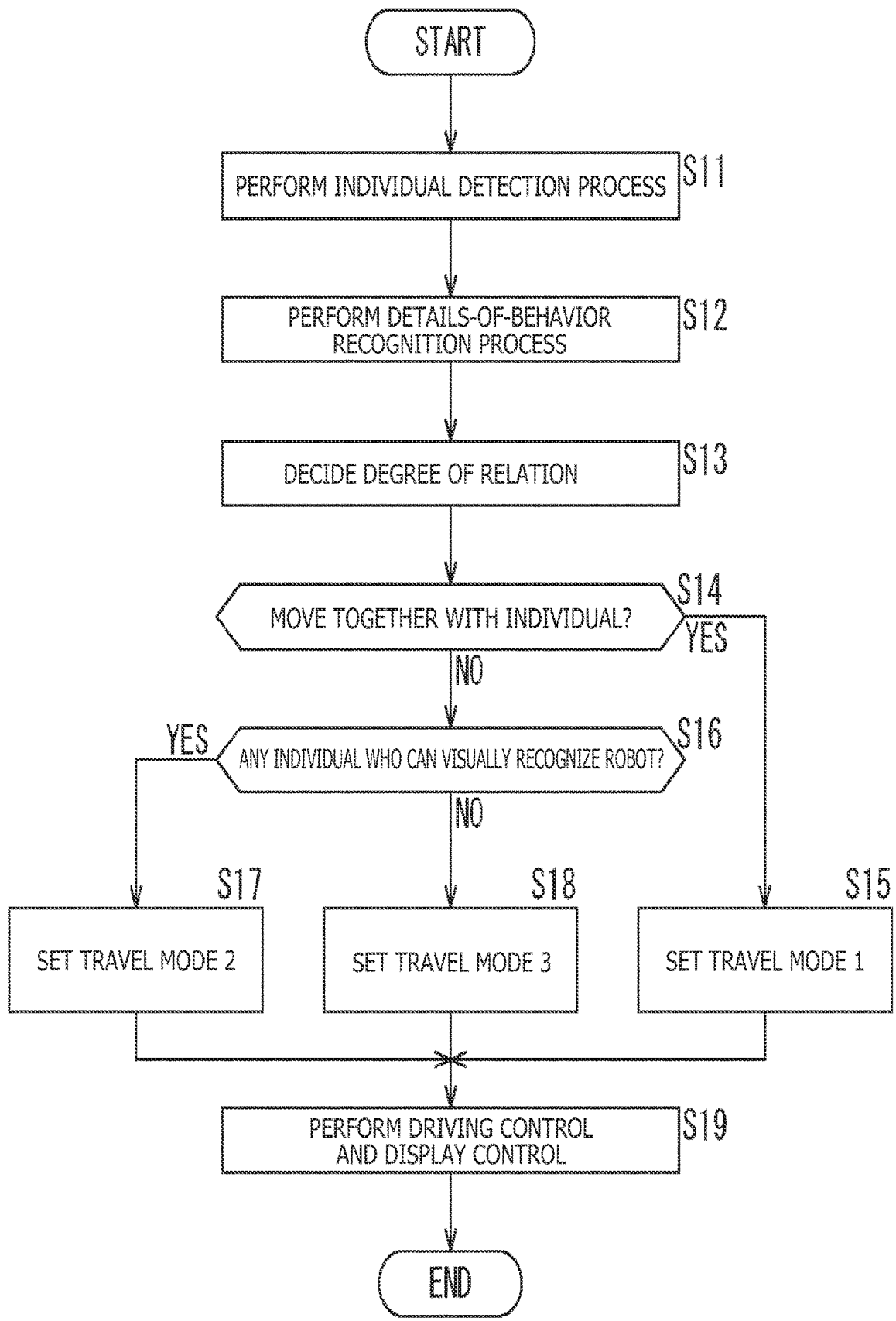
FIG. 5 is a flowchart describing a mobile object control process.

FIG. 5 is a flowchart describing the mobile object control process for the computation section 22 to control the movement of the autonomous mobile robot 12.

For example, the mobile object control process is performed when the autonomous mobile robot 12 starts moving, and in step S11, the computation section 22 performs an individual detection process of detecting a surrounding individual in the vicinity of the autonomous mobile robot 12 on the basis of input information supplied from the input section 21.

The individual detection process may be performed by using not only an RGB image acquired by imaging with the RGB camera 32 of the input section 21 but also, for example, an RGB image acquired by the sensor module 14 in FIG. 1 and a thermal image acquired by an unillustrated thermal camera. Further, individuals may be detected through motion detection using an unillustrated LIDAR or depth sensor. Alternatively, a determination may be made as to whether or not there is an individual in the vicinity of the autonomous mobile robot 12 by means of communication with a wearable terminal worn on an individual's body.

In step S12, the computation section 22 performs a details-of-behavior recognition process of recognizing details of behavior of the autonomous mobile robot 12 itself performed as a result of the movement initiated by the autonomous mobile robot 12. For example, the autonomous mobile robot 12 carries out details of behavior in which it moves to follow an individual, details of behavior in which it moves to guide an individual, details of behavior in which it moves together with an individual, details of behavior in which it moves in response to a command from an individual or on its own initiative, and details of behavior in which it moves separately from an individual. Accordingly, the computation section 22 recognizes which of these details of behavior is to be carried out.

In step S13, the computation section 22 decides the degree of relation between the autonomous mobile robot 12 and the surrounding individual on the basis of both results of the individual detection process in step S11 and results of the details-of-behavior recognition process in step S12. For example, the computation section 22 can perform computations for scoring a combination of the presence or absence of a surrounding individual based on the detection results of the individual detection process and various sets of details of behavior as described above based on the recognition results of the details-of-behavior recognition process, deciding the score obtained by the computations as a degree of relation. It should be noted that the computation section 22 may decide the degree of relation on the basis of either the detection results of the individual detection process or the recognition results of the details-of-behavior recognition process.

In step S14, the computation section 22 determines whether or not the autonomous mobile robot 12 will move together with the surrounding individual, on the basis of the degree of relation with the surrounding individual decided in step S13.

In the case where the computation section 22 determines in step S14 that the autonomous mobile robot 12 will move together with the surrounding individual, the process proceeds to step S15. In step S15, the computation section 22 first sets a travel mode 1 in which the autonomous mobile robot 12 changes the direction of the housing when changing the travel route before starting to travel, and then, the process proceeds to step S19.

Meanwhile, in the case where the computation section 22 determines in step S14 that the autonomous mobile robot 12 will not move together with the surrounding individual (i.e., will move separately from the surrounding individual), the process proceeds to step S16. In step S16, the computation section 22 determines whether or not a surrounding individual who can visually recognize the autonomous mobile robot 12 is present, on the basis of the degree of relation with the surrounding individual decided in step S13.

In the case where the computation section 22 determines in step S16 that a surrounding individual who can visually recognize the autonomous mobile robot 12 is present, the process proceeds to step S17. In step S17, the computation section 22 sets a travel mode 2 in which the autonomous mobile robot 12 performs representation of a direction of travel and a direction change for presenting a travel route for traveling, and then, the process proceeds to step S19.

Meanwhile, in the case where the computation section 22 determines in step S16 that a surrounding individual who can visually recognize the autonomous mobile robot 12 is absent, the process proceeds to step S18. In step S18, the computation section 22 sets a travel mode 3 in which the autonomous mobile robot 12 does not perform representation of any direction of travel or direction change for presenting a travel route and travels without changing the direction of the housing when changing the travel route, and then, the process proceeds to step S19.

In step S19, the computation section 22 controls the driving of the driving section 23 and the display of the display section 24 on the basis of the travel mode decided in step S15, S17, or S18, and then, the mobile object control process is terminated.

As the mobile object control process as described above is performed, the autonomous mobile robot 12 can switch between three travel modes 1 to 3 on the basis of the degree of relation with the surrounding individual.

For example, in the case where the degree of relation is highest such that the autonomous mobile robot 12 moves together with the surrounding individual, the travel mode 1 in which the autonomous mobile robot 12 changes the direction of the housing when changing the travel route for traveling is set. As a result, as the autonomous mobile robot 12 travels such that a forward direction relative to the direction of the housing always faces the direction of travel, the surrounding individual can readily recognize the direction of travel from the direction of the housing of the autonomous mobile robot 12. In this case, there is no fear that the autonomous mobile robot 12 will travel in such a manner as to prevent easy recognition by the surrounding individual, one example of which being changing the travel route to move sideways relative to the direction of the housing, thus contributing to improved sense of security.

Also, in the case where the degree of relation is more or less such that a surrounding individual who can visually recognize the autonomous mobile robot 12 is present but the autonomous mobile robot 12 does not move together with the surrounding individual (the degree of relation is lower than that in the case of moving together with the surrounding individual), the travel mode 2 in which the autonomous mobile robot 12 performs representation of the direction of travel and a direction change for presenting a travel route for traveling is set. As a result, when traveling in such a manner as to change the travel route and move sideways relative to the direction of the housing, the autonomous mobile robot 12 presents a travel route by representation of a direction of travel and a direction change, reliably enabling the surrounding individual to recognize the travel route of the autonomous mobile robot 12.

Then, in the case where the degree of relation is lowest such that the autonomous mobile robot 12 does not move together with the surrounding individual and that a surrounding individual who can visually recognize the autonomous mobile robot 12 is absent, a travel mode 3 in which the autonomous mobile robot 12 does not perform representation of any direction of travel or direction change for presenting a travel route and travels without changing the direction of the housing when changing the travel route is set. That is, in this case, because there is no need to make the surrounding individual aware of the travel route of the autonomous mobile robot 12, the autonomous mobile robot 12 travels efficiently without presenting any travel route (e.g., traveling with the forward direction relative to the direction of the housing always facing the direction of travel is inefficient).

As described above, the autonomous mobile robot 12 can improve the method of presenting the travel route by controlling the driving and display in a travel mode suitable for the degree of relation with the surrounding individual. For example, a travel route can be presented such that the higher the degree of relation with the surrounding individual, the higher the sense of security perceived, and a travel route that ensures reduced learning burden on the surrounding individual (e.g., through driving and representation) can be presented.

It should be noted that the computation section 22 may set a travel mode that takes into account details of behavior, by using recognition results themselves of the details-of-behavior recognition process in step S12 as a degree of relation. For example, in the case where recognition results of the details-of-behavior recognition process indicate that the autonomous mobile robot 12 is to move together with the surrounding individual, the computation section 22 can set the travel mode 1. Similarly, the computation section 22 can set a travel mode that takes into account the presence or absence of a surrounding individual, by using detection results themselves of the individual detection process in step S11 as a degree of relation. For example, the computation section 22 can set the travel mode 2 in the case where detection results of the individual detection process indicate that a surrounding individual is present and set the travel mode 3 in the case where detection results of the individual detection process indicate that no surrounding individual is present.

Here, each of the three travel modes 1 to 3 of the autonomous mobile robot 12 fits into one of five travel patterns on the basis of whether or not the direction of the housing is changed when changing the travel route and whether or not representation of a direction of travel and a direction change for presenting a travel route is to be performed.

The relation between the travel patterns and the travel modes in the autonomous mobile robot 12 will be described with reference to FIG. 6.

As illustrated in FIG. 6, travel patterns A to E are classified based on whether or not the display section 24 performs representation of the direction of travel and a direction change for presenting a travel route of the autonomous mobile robot 12 and whether or not the driving section 23 is driven to change the direction so as to change the travel route of the autonomous mobile robot 12.

In the travel pattern A, the display section 24 does not perform representation of any direction of travel or direction change for presenting a travel route of the autonomous mobile robot 12. Also, in the travel pattern A, the driving section 23 is not driven to change the direction so as to change the travel route of the autonomous mobile robot 12.

In the travel pattern B, the display section 24 does not perform representation of any direction of travel or direction change for presenting a travel route of the autonomous mobile robot 12. Further, in the travel pattern B, the driving section 23 is driven to change the direction so as to change the travel route of the autonomous mobile robot 12.

In the travel pattern C, the display section 24 performs representation of the direction of travel but not a direction change to present a travel route of the autonomous mobile robot 12. Further, in the travel pattern C, the driving section 23 is driven to change the direction so as to change the travel route of the autonomous mobile robot 12.

In the travel pattern D, the display section 24 performs representation of the direction of travel and a direction change to present a travel route of the autonomous mobile robot 12. Further, in the travel pattern D, the driving section 23 is not driven to change the direction so as to change the travel route of the autonomous mobile robot 12.

In the travel pattern E, the display section 24 performs representation of the direction of travel and a direction change to present a travel route of the autonomous mobile robot 12. Further, in the travel pattern E, the driving section 23 is driven to change the direction so as to change the travel route of the autonomous mobile robot 12.

Therefore, as described with reference to the flowchart in FIG. 5, the travel pattern B or C in which the driving section 23 is driven to change the direction so as to change the travel route applies to the travel mode 1 set in the case where the autonomous mobile robot 12 moves together with the surrounding individual.

The travel pattern D or E in which the display section 24 performs representation of the direction of travel and a direction change to present a travel route applies to the travel mode 2 set in the case where the autonomous mobile robot 12 does not move together with the surrounding individual but a surrounding individual who can visually recognize the autonomous mobile robot 12 is present.

Also, the travel pattern A in which the display section 24 does not perform representation of any direction of travel or direction change to present a travel route and the driving section 23 is not driven to change the direction so as to change the travel route applies to the travel mode 3 set in the case where the autonomous mobile robot 12 does not move together with the surrounding individual and there is no surrounding individual who can visually recognize the autonomous mobile robot 12.

Figure 7A:
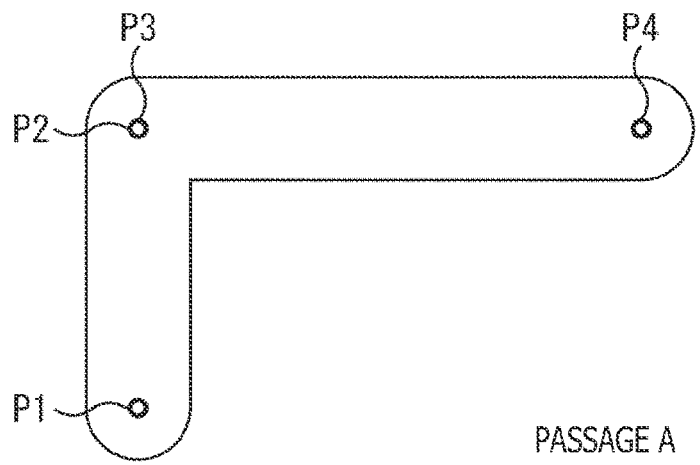
FIGS. 7A and 7B depict diagrams illustrating two kinds of passages, i.e., passages A and B, used to describe travel patterns of the autonomous mobile robot.
Figure 7B:
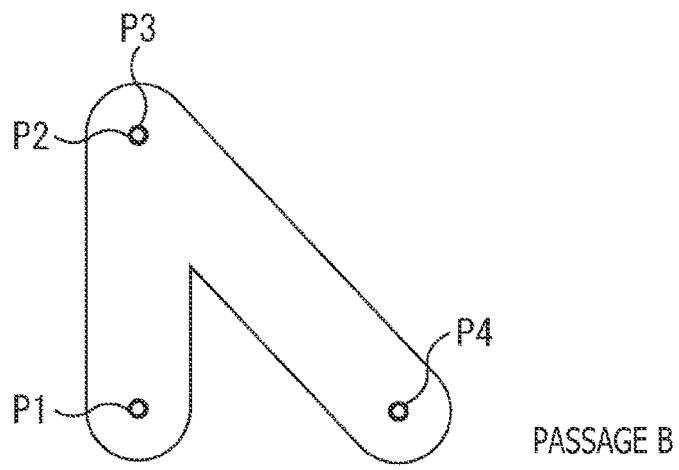

Here, a description will be given below of the travel patterns of the autonomous mobile robot 12 for two types of passages, i.e., passages A and B, as illustrated in FIGS. 7A and 7B.

That is, FIG. 7A depicts the passage A whose travel route bends in units of 90°. Therefore, for example, in the case where the housing of the autonomous mobile robot 12 is square, the direction of the lateral faces of the autonomous mobile robot 12 agrees with the direction in which the travel route bends.

Further, FIG. 7B depicts the passage B whose travel route bends at an angle other than 90° (e.g., at an acute angle as illustrated). Therefore, for example, in the case where the housing of the autonomous mobile robot 12 is square, the direction of the lateral faces of the autonomous mobile robot 12 does not agree with the direction in which the travel route bends.

It should be noted that passage points P1 to P4 illustrated in FIGS. 7A and 7B indicate points where driving control and display control of the autonomous mobile robot 12 are changed in the passages A and B. For example, the passage point P1 indicates where driving control is performed so that the autonomous mobile robot 12 starts traveling, and the passage point P2 indicates where driving control is performed so that the autonomous mobile robot 12 comes to a halt as it approaches a corner. Further, the passage point P3 indicates where driving control ends during turn or the like at the corner, and the passage point P4 indicates where driving control is performed so that the autonomous mobile robot 12 ends its traveling.

A description will be given of a configuration example in which the display section 24 of the autonomous mobile robot 12 includes plural light-emitting sections arranged linearly and light emission intensity of the light-emitting sections in the configuration example, with reference to FIGS. 8A and 8B.

Figure 8A:
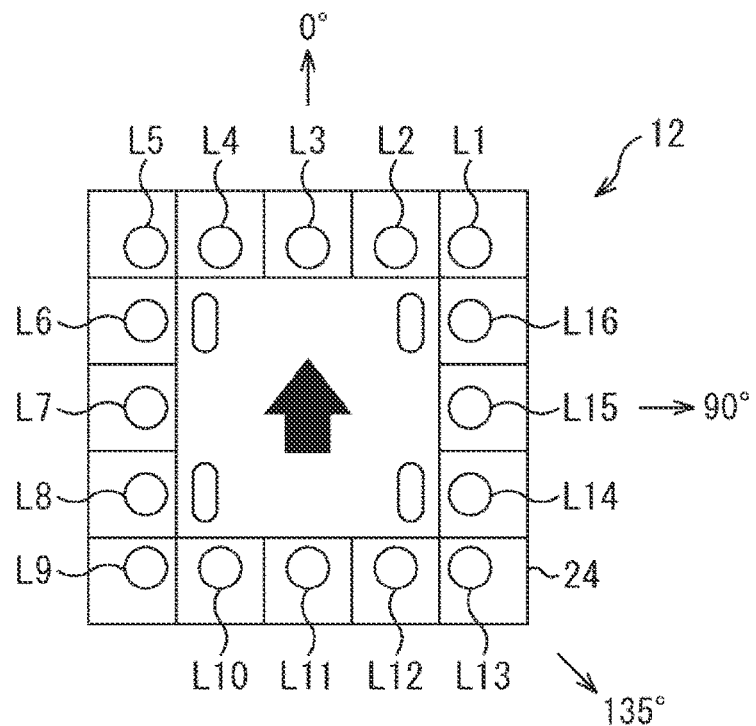
FIGS. 8A and 8B depict diagrams describing a configuration example and a display intensity of a display section.
Figure 8B:
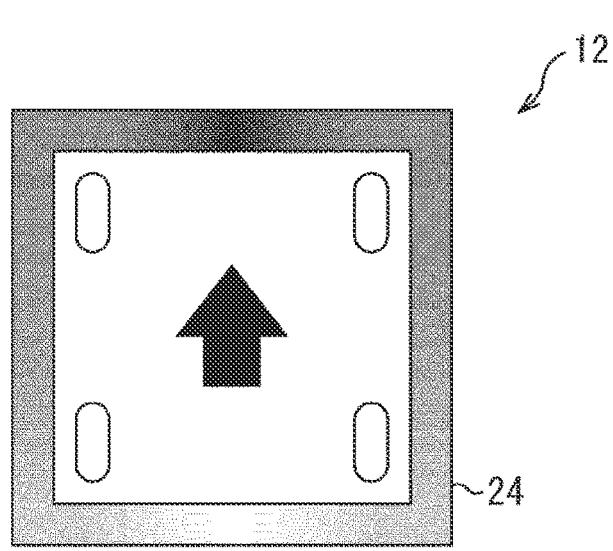

In FIGS. 8A and 8B, FIG. 8A illustrates a configuration example of the display section 24, and B illustrates an example of light emission intensity of the light-emitting sections of the display section 24.

In FIGS. 8A and 8B, FIG. 8A illustrates the configuration example of the display section 24 in a simplified manner, and in the configuration example, the housing of the autonomous mobile robot 12 is square, and each lateral face of the perimeter of the housing is divided into five parts with one of 16 light-emitting sections L1 to L16 arranged in each part. For example, assuming that the direction indicated by a black-filled arrow is the forward direction relative to the direction of the housing of the autonomous mobile robot 12, the light-emitting section L1 is assigned to a forward right edge of the autonomous mobile robot 12, and the light-emitting sections L2 to L16 are assigned counterclockwise in sequence. Also, in the description given below, the forward direction relative to the direction of the housing is assumed to be 0°, that is, moving clockwise, the rightward direction relative to the direction of the housing (the direction in which the autonomous mobile robot 12 turns in the passage FIG. 7A) is assumed to be 90°, and the rightward rearward direction relative to the direction of the housing (the direction in which the autonomous mobile robot 12 turns in the passage FIG. 7B) is assumed to be 135°.

Therefore, in the case where the autonomous mobile robot 12 moves forward relative to the direction of the housing, the display section 24 can perform representation of the direction of travel by making, in keeping with the direction of travel, the display intensity the light-emitting section L3 at a center portion of the front face relative to the direction of the housing highest.

In FIGS. 8A and 8B, FIG. 8B illustrates the representation of the direction of travel by the display section 24 such that the higher the display intensity, the darker the gradation, and the lower the display intensity, the lighter the gradation. Therefore, in the case where the display intensity of the light-emitting section L3 is highest as a result of the forward movement of the autonomous mobile robot 12 relative to the direction of the housing, the display intensity is highest at the center portion of the front face relative to the direction of the housing.

<Changing the Travel Route Based on the Travel Pattern>

A description will be given of driving control and display control performed when the travel route is changed based on one of the travel patterns A to E illustrated in FIG. 6, with reference to FIGS. 9, 10, 11, 12, 13, 14, 15A, 15B, 16, 17, 18A, 18B, 19, 20A, and 20B.

Figure 10:
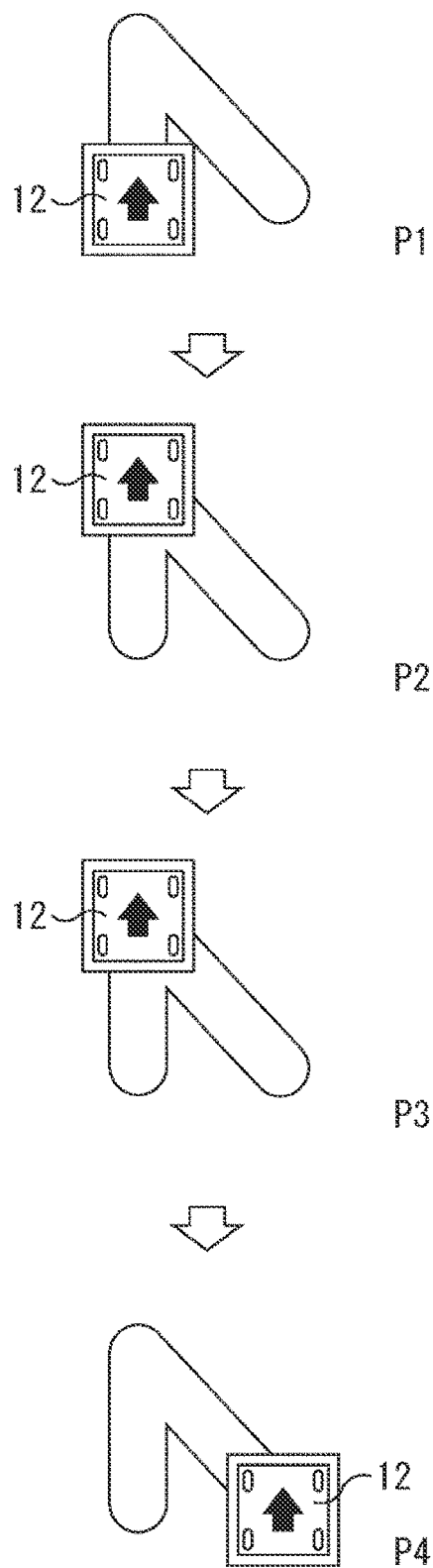
FIG. 10 is a diagram illustrating an example of changing the travel route in the travel pattern A in a passage B.

FIG. 9 illustrates an example of changing a travel route in the travel pattern A in the passage A, and FIG. 10 illustrates an example of changing the travel route in the travel pattern A in the passage B.

As illustrated in FIG. 9, the computation section 22 controls, in the passage A, the driving of the driving section 23 such that the autonomous mobile robot 12 starts moving forward relative to the direction of the housing (0°) from the passage point P1 and such that the autonomous mobile robot 12 comes to a halt after moving to the passage point P2. Then, the computation section 22 controls the driving of the driving section 23 such that the autonomous mobile robot 12 starts moving again without changing the direction of the housing after changing the direction of travel to head to the right relative to the direction of the housing (90°) from the passage point P3 and such that the autonomous mobile robot 12 comes to a halt after moving to the passage point P4. It should be noted that, while these kinds of driving control are performed in the travel pattern A, the computation section 22 does not control the display of the display section 24.

As illustrated in FIG. 10, the computation section 22 controls, in the passage B, the driving of the driving section 23 such that the autonomous mobile robot 12 starts moving forward relative to the direction of the housing (0°) from the passage point P1 and such that the autonomous mobile robot 12 comes to a halt after moving to the passage point P2. Then, the computation section 22 controls the driving of the driving section 23 such that the autonomous mobile robot 12 starts moving again without changing the direction of the housing after changing the direction of travel to head rearward and to the right relative to the direction of the housing (135°) from the passage point P3 and such that the autonomous mobile robot 12 comes to a halt after moving to the passage point P4. It should be noted that, while these kinds of driving control are performed in the travel pattern A, the computation section 22 does not control the display of the display section 24.

As described above, in the travel pattern A, the display section 24 does not perform representation of any direction of travel or direction change to present a travel route of the autonomous mobile robot 12, and the driving section 23 is not driven to change the direction so as to change the travel route of the autonomous mobile robot 12. Therefore, in the travel pattern A, the autonomous mobile robot 12 changes the travel route while at the same time maintaining the direction of the housing constant in such a manner as to move in parallel without presenting any direction of travel or direction change in both the passages A and B.

Figure 12:
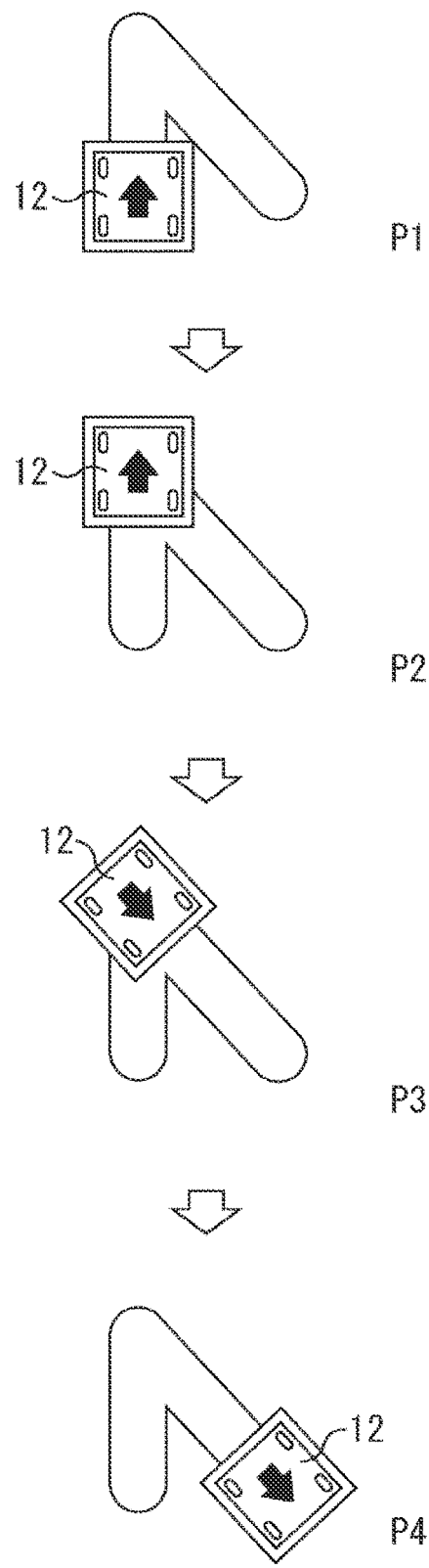
FIG. 12 is a diagram illustrating an example of changing the travel route in the travel pattern B in the passage B.

FIG. 11 illustrates an example of changing the travel route in the travel pattern B in the passage A, and FIG. 12 illustrates an example of changing the travel route in the travel pattern B in the passage B.

As illustrated in FIG. 11, the computation section 22 controls, in the passage A, the driving of the driving section 23 such that the autonomous mobile robot 12 starts moving forward relative to the direction of the housing (0°) from the passage point P1 and such that the autonomous mobile robot 12 comes to a halt after moving to the passage point P2. Then, the computation section 22 controls the driving of the driving section 23 such that the autonomous mobile robot 12 starts moving forward again relative to the direction of the housing (0°) from the passage point P3 after changing the direction of the housing by 90° through clockwise rotation and such that the autonomous mobile robot 12 comes to a halt after moving to the passage point P4. It should be noted that, while these kinds of driving control are performed in the travel pattern B, the computation section 22 does not control the display of the display section 24.

As illustrated in FIG. 12, the computation section 22 controls, in the passage B, the driving of the driving section 23 such that the autonomous mobile robot 12 starts moving forward relative to the direction of the housing (0°) from the passage point P1 and such that the autonomous mobile robot 12 comes to a halt after moving to the passage point P2. Then, the computation section 22 controls the driving of the driving section 23 such that the autonomous mobile robot 12 starts moving forward again relative to the direction of the housing (0°) from the passage point P3 after changing the direction of the housing by 135° through clockwise rotation and such that the autonomous mobile robot 12 comes to a halt after moving to the passage point P4. It should be noted that, while these kinds of driving control are performed in the travel pattern B, the computation section 22 does not control the display of the display section 24.

As described above, in the travel pattern B, the display section 24 does not perform representation of any direction of travel or direction change to present a travel route of the autonomous mobile robot 12. Meanwhile, the driving section 23 is driven to change the direction so as to change the travel route of the autonomous mobile robot 12. Therefore, in the travel pattern B, the autonomous mobile robot 12 changes the travel route by changing the direction of the housing according to the angle of the passage without presenting any direction of travel or direction change in both the passages A and B.

Figure 13:
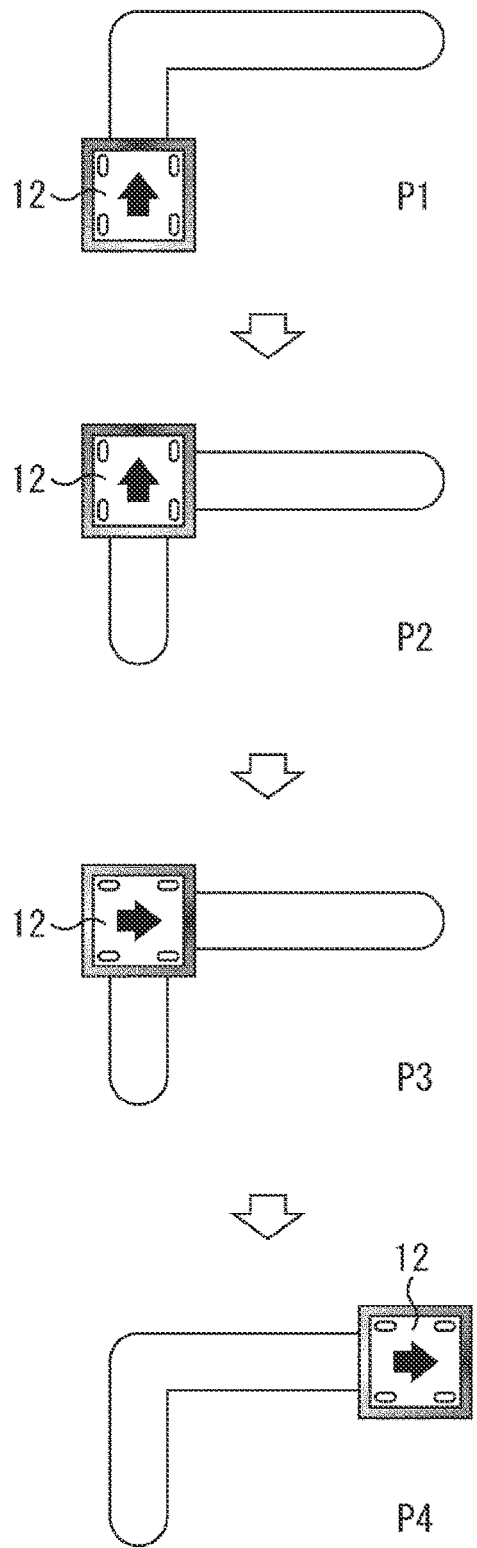
FIG. 13 is a diagram illustrating an example of changing the travel route in a travel pattern C in the passage A.
Figure 15A:
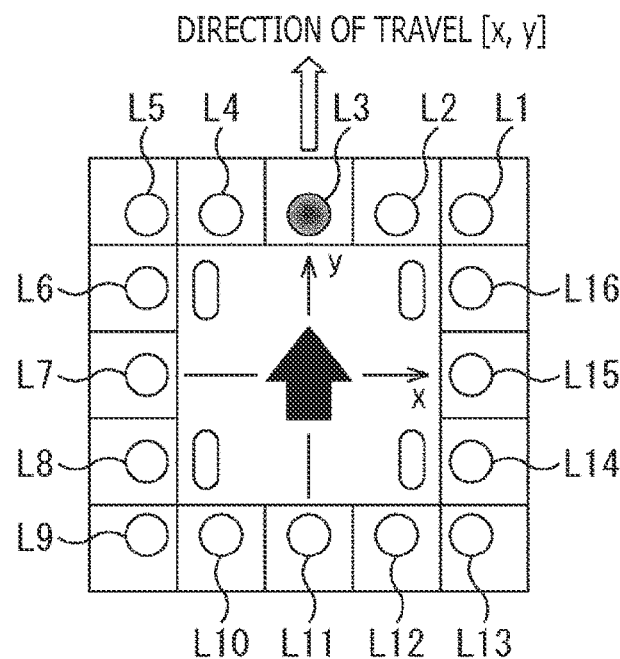
FIGS. 15A and 15B depict diagrams describing a highest display intensity of the travel pattern C.
Figure 15B:
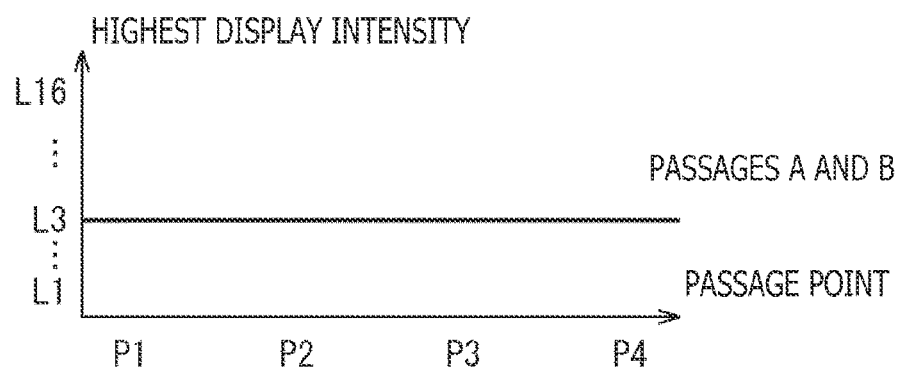

FIG. 13 illustrates an example of changing the travel route in the travel pattern C in the passage A, and FIG. 14 illustrates an example of changing the travel route in the travel pattern C in the passage B. Also, FIGS. 15A and 15B illustrate a light-emitting section whose display intensity reaches a maximum level at the passage points P1 to P4 when the travel route is changed in the travel pattern C.

As illustrated in FIG. 13, the computation section 22 controls, in the passage A, the driving of the driving section 23 such that the autonomous mobile robot 12 starts moving forward relative to the direction of the housing (0°) from the passage point P1 and controls the display of the display section 24 such that the center portion of the front face relative to the direction of the housing is illuminated at the highest intensity in keeping with the direction of travel. Also, the computation section 22 controls the display section 24 to illuminate the center portion of the front face relative to the direction of the housing at the highest intensity in keeping with the direction of travel up to then, when controlling the driving of the driving section 23 such that the autonomous mobile robot 12 comes to a halt after moving to the passage point P2.

Then, the computation section 22 changes the direction of the housing of the autonomous mobile robot 12 by 90° through clockwise rotation. At this time, the center portion of the front face relative to the direction of the housing oriented forward relative to the direction of travel remains illuminated at the highest intensity in response to the change in the direction of the housing of the autonomous mobile robot 12. Thereafter, the computation section 22 controls the driving of the driving section 23 such that the autonomous mobile robot 12 starts moving forward again relative to the direction of the housing (0°) from the passage point P3 and such that the autonomous mobile robot 12 comes to a halt after moving to the passage point P4.

As illustrated in FIG. 14, the computation section 22 controls, in the passage B, the driving of the driving section 23 such that the autonomous mobile robot 12 starts moving forward relative to the direction of the housing (0°) from the passage point P1 and controls the display of the display section 24 such that the center portion of the front face relative to the direction of the housing is illuminated at the highest intensity in keeping with the direction of travel. Also, the computation section 22 controls the display section 24 to illuminate the center portion of the front face relative to the direction of the housing at the highest intensity in keeping with the direction of travel up to then, when controlling the driving of the driving section 23 such that the autonomous mobile robot 12 comes to a halt after moving to the passage point P2.

Then, the computation section 22 changes the direction of the housing of the autonomous mobile robot 12 by 135° through clockwise rotation. At this time, the center portion of the front face relative to the direction of the housing oriented forward relative to the direction of travel remains illuminated at the highest intensity in response to the change in the direction of the housing of the autonomous mobile robot 12. Thereafter, the computation section 22 controls the driving of the driving section 23 such that the autonomous mobile robot 12 starts moving forward again relative to the direction of the housing (0°) from the passage point P3 and such that the autonomous mobile robot 12 comes to a halt after moving to the passage point P4.

As described above, in the travel pattern C, the display section 24 performs representation of the direction of travel to present a travel route of the autonomous mobile robot 12 (the center portion of the front face relative to the direction of the housing is illuminated at the highest intensity), and the driving section 23 is driven to change the direction so as to change the travel route of the autonomous mobile robot 12. At this time, the orientation of the front face relative to the direction of the housing is also changed in response to the change in the direction of the autonomous mobile robot 12. Therefore, the display section 24 does not perform representation of any direction change (e.g., movement of the light-emitting section illuminated at the highest intensity) to present a travel route of the autonomous mobile robot 12. Accordingly, in the travel pattern C, the autonomous mobile robot 12 performs representation of the direction of travel but not a direction change and changes the travel route by changing the direction of the housing according to the angle of the passage in both the passages A and B.

In other words, in the travel pattern C, the forward direction relative to the direction of the housing of the autonomous mobile robot 12 is always the direction of travel. As illustrated in FIG. 15A, therefore, the display section 24 illuminates the light-emitting section L3 at the center portion of the front face relative to the direction of the housing at the highest intensity. Then, in the travel pattern C, the front face relative to the direction of the housing of the autonomous mobile robot 12 is always oriented forward relative to the direction of travel. Therefore, the light-emitting section L3 has the highest display intensity in any one of the passage points P1 to P4 as illustrated in FIG. 15B.

Figure 16:
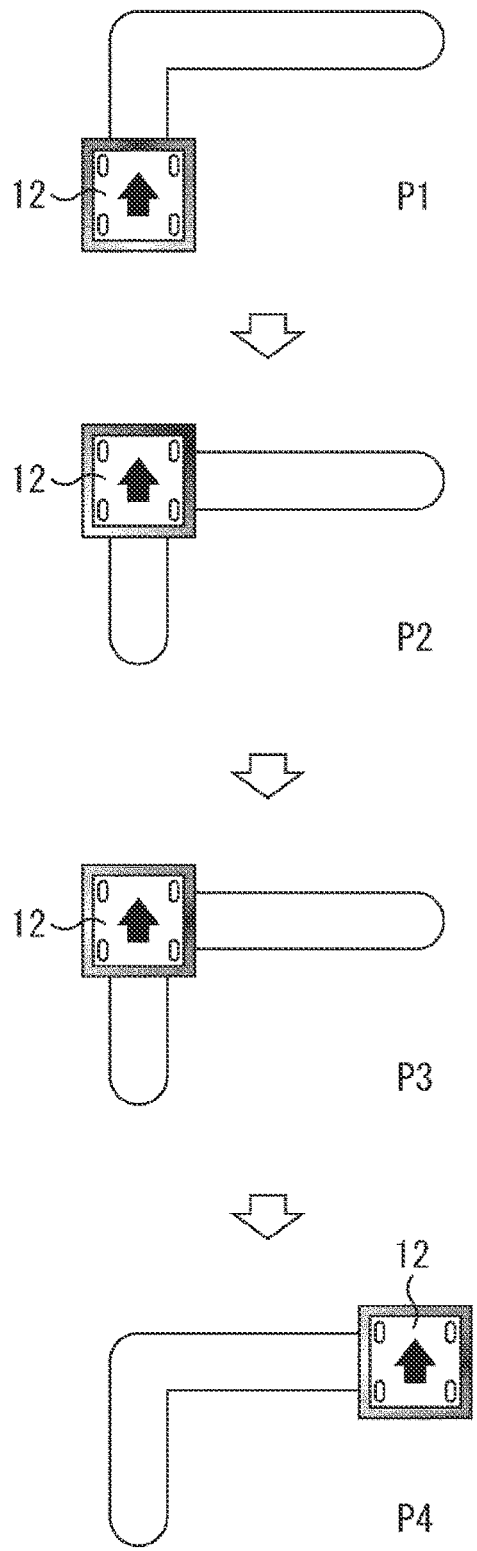
FIG. 16 is a diagram illustrating an example of changing the travel route in a travel pattern D in the passage A.
Figure 17:
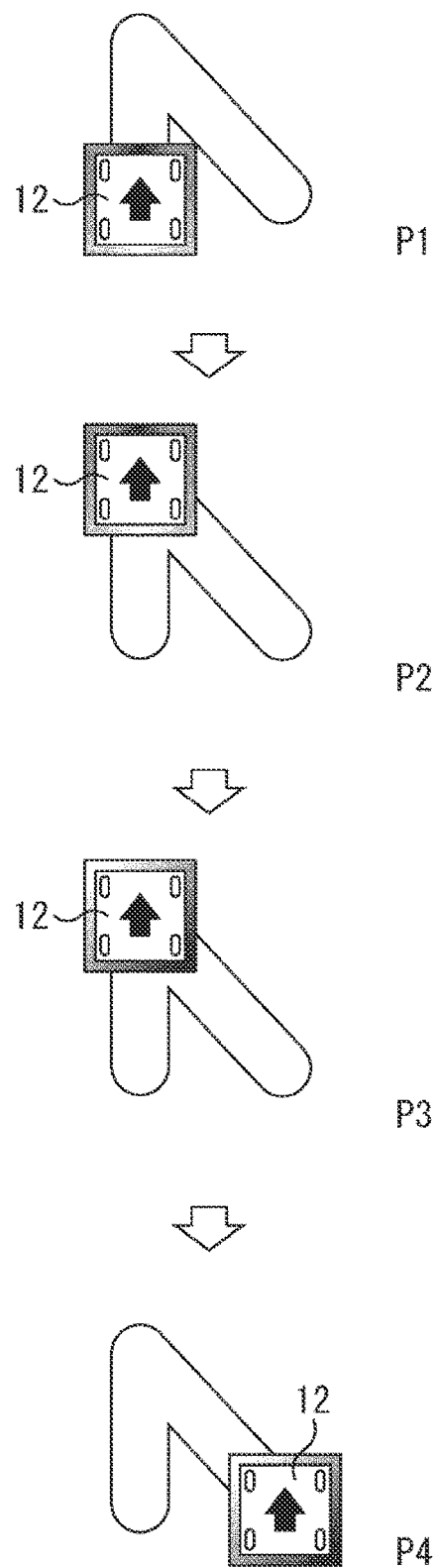
FIG. 17 is a diagram illustrating an example of changing the travel route in the travel pattern D in the passage B.
Figure 18A:
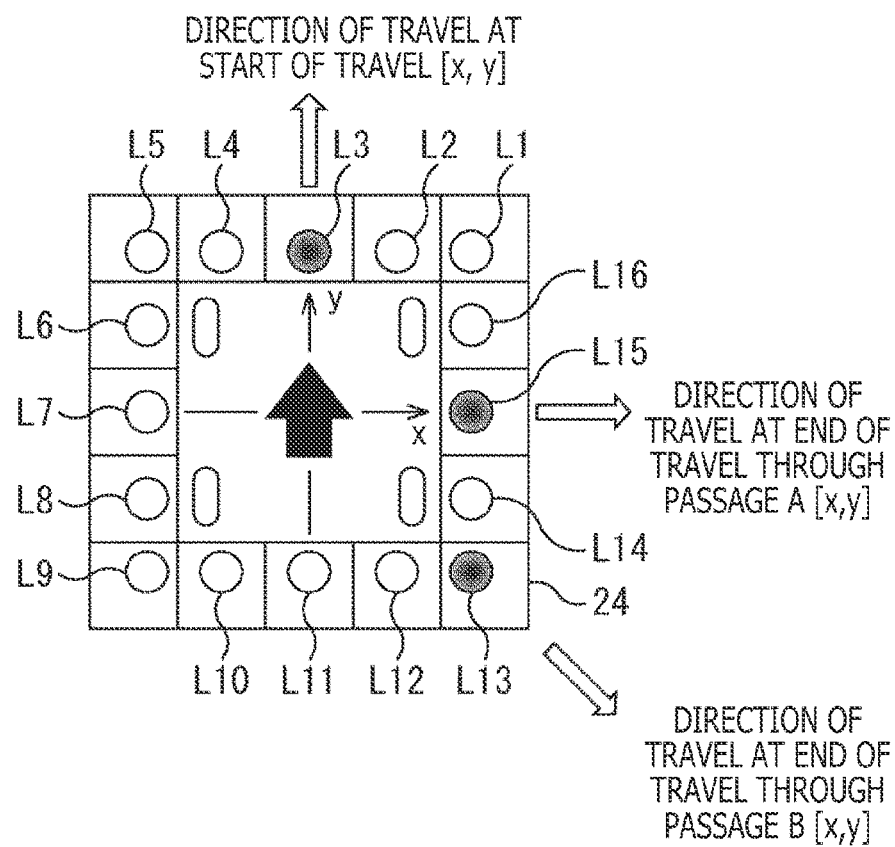
FIGS. 18A and 18B depict diagrams describing a highest display intensity of the travel pattern D.
Figure 18B:
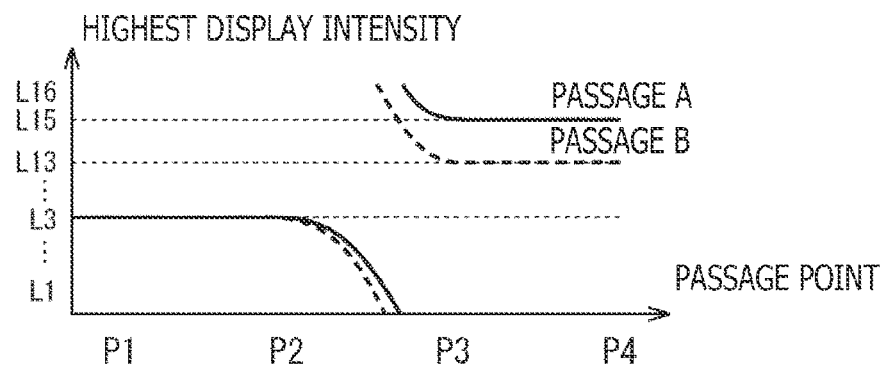

FIG. 16 illustrates an example of changing the travel route in the travel pattern D in the passage A, and FIG. 17 illustrates an example of changing the travel route in the travel pattern D in the passage B. Further, FIGS. 18A and 18B illustrate light-emitting sections whose display intensity reaches a maximum level at the passage points P1 to P4 when the travel route is changed in the travel pattern D.

As illustrated in FIG. 16, the computation section 22 controls, in the passage A, the driving of the driving section 23 such that the autonomous mobile robot 12 starts moving forward relative to the direction of the housing (0°) from the passage point P1 and controls the display of the display section 24 such that the center portion of the front face relative to the direction of the housing is illuminated at the highest intensity in keeping with the direction of travel. Also, the computation section 22 first controls the driving of the driving section 23 such that the autonomous mobile robot 12 comes to a halt after moving to the passage point P2 and then controls the display of the display section 24 such that the illumination at the highest intensity is moved in response to the change in the direction of travel to the right (90°) without any change of the direction of the housing of the autonomous mobile robot 12.

Therefore, the display section 24 moves the illumination at the highest intensity from the center portion of the front face relative to the direction of the housing to the center portion of the right face relative to the direction of the housing in keeping with the direction of travel. Thereafter, the computation section 22 controls the driving of the driving section 23 such that the autonomous mobile robot 12 starts moving again to the right relative to the direction of the housing (90°) from the passage point P3 and such that the autonomous mobile robot 12 comes to a halt after moving to the passage point P4.

As illustrated in FIG. 17, the computation section 22 controls, in the passage B, the driving of the driving section 23 such that the autonomous mobile robot 12 starts moving forward relative to the direction of the housing (0°) from the passage point P1 and controls the display of the display section 24 such that the center portion of the front face relative to the direction of the housing is illuminated at the highest intensity in keeping with the direction of travel. Further, the computation section 22 first controls the driving of the driving section 23 such that the autonomous mobile robot 12 comes to a halt after moving to the passage point P2 and then controls the display of the display section 24 such that the illumination at the highest intensity is moved in response to the change in the direction of travel rearward to the right (135°) without any change of the direction of the housing of the autonomous mobile robot 12.

Accordingly, the display section 24 moves the illumination at the highest intensity from the center portion of the front face relative to the direction of the housing, illuminating a right rear edge relative to the direction of the housing at the highest intensity in keeping with the direction of travel. Thereafter, the computation section 22 controls the driving of the driving section 23 such that the autonomous mobile robot 12 starts moving again to head rearward to the right relative to the direction of the housing (135°) from the passage point P3 and such that the autonomous mobile robot 12 comes to a halt after moving to the passage point P4.

As described above, in the travel pattern D, the direction of travel is presented first as the display section 24 illuminates the center portion of the front face relative to the direction of the housing of the autonomous mobile robot 12 at the highest intensity, and then, the change in the direction of travel is presented by moving the illumination at the highest intensity. Further, the direction of the housing of the autonomous mobile robot 12 is not changed by the driving section 23. Therefore, in the travel pattern D, the autonomous mobile robot 12 presents the direction of travel and a direction change and changes the travel route while at the same time maintaining the direction of the housing constant in such a manner as to move in parallel, in both the passages A and B.

In other words, in the travel pattern D, as illustrated in FIG. 18A, the display section 24 illuminates the light-emitting section L3 at the center portion of the front face relative to the direction of the housing at the highest intensity in keeping with the direction of travel as of the start of the traveling. Then, as a result of the change in the travel route, the display section 24 illuminates the light-emitting section L15 at the center portion of the right face relative to the direction of the housing at the highest intensity in the passage A and illuminates the light-emitting section L13 at the right rear edge relative to the direction of the housing at the highest intensity in the passage B.

Accordingly, as illustrated in FIG. 18B, the light-emitting section L3 has the highest display intensity from the passage point P1 to the passage point P2. Then, the section having the highest display intensity is changed from the light-emitting section L3 toward the light-emitting section L15 in the passage A and is changed from the light-emitting section L3 toward the light-emitting section L13 in the passage B. Thereafter, the light-emitting section L15 has the highest display intensity in the passage A, and the light-emitting section L13 has the highest display intensity in the passage B, from the passage point P3 to the passage point P4.

As described above, in the travel pattern D, although the direction of the housing of the autonomous mobile robot 12 is maintained constant in connection with the change in the travel route, the display section 24 performs representation of having the forward direction of travel have the highest display intensity, making it possible to properly present the travel route of the autonomous mobile robot 12. It should be noted that the change regarding the highest display intensity from the passage point P2 to the passage point P3 may be represented not only in the form of a curve as illustrated but also in the form of a linear or binary change, an overshoot in the opposite direction, and the like.

Figure 19:
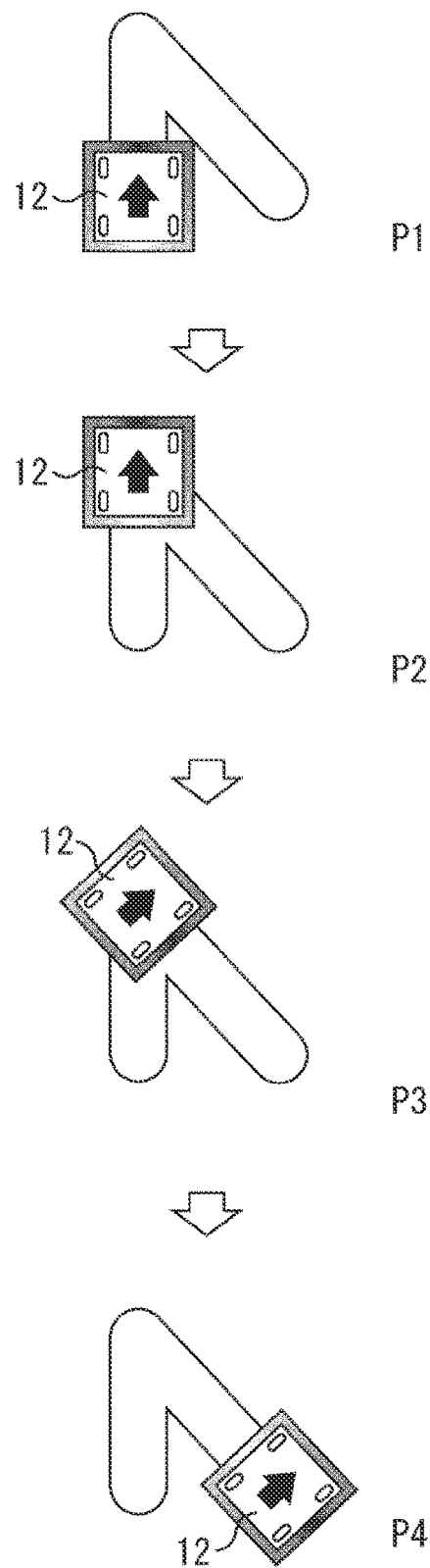
FIG. 19 is a diagram illustrating an example of changing the travel route in a travel pattern E in the passage B.
Figure 20A:
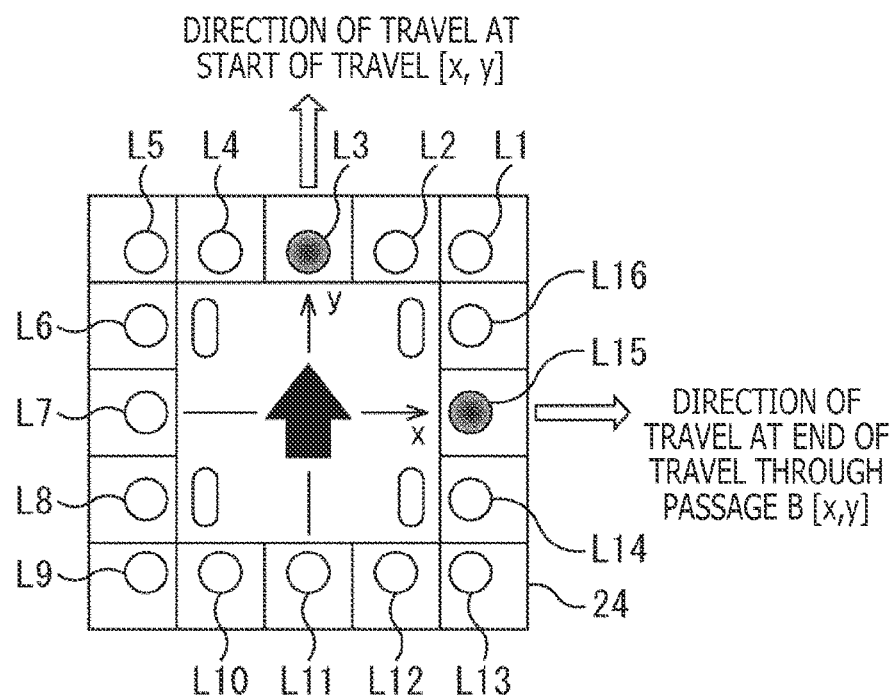
FIGS. 20A and 20B depict diagrams describing a highest display intensity of a travel pattern E.
Figure 20B:
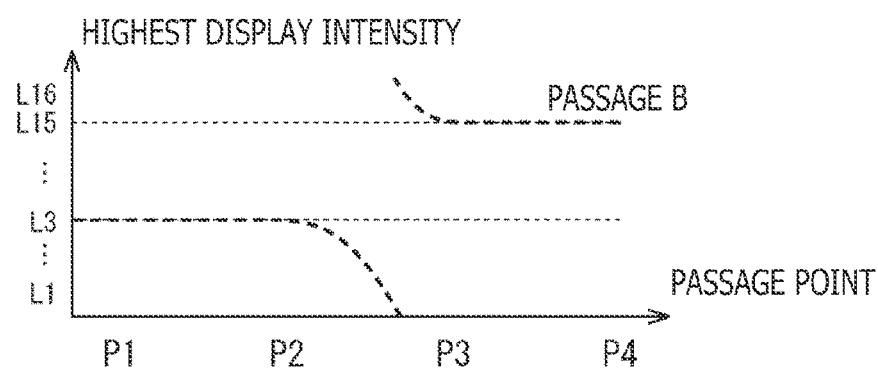

FIG. 19 illustrates an example of changing the travel route in the travel pattern E in the passage B. Also, FIGS. 20A and 20B illustrate the light-emitting sections having the highest display intensity when the travel route is changed in the travel pattern E from the passage point P1 to the passage point P4.

As illustrated in FIG. 19, the computation section 22 controls, in the passage B, the driving of the driving section 23 such that the autonomous mobile robot 12 starts moving forward relative to the direction of the housing (0°) from the passage point P1 and controls the display of the display section 24 such that the center portion of the front face relative to the direction of the housing is illuminated at the highest intensity in keeping with the direction of travel. Also, the computation section 22 controls the driving of the driving section 23 such that the autonomous mobile robot 12 comes to a halt after moving to the passage point P2.

Then, the computation section 22 controls the driving of the driving section 23 such that the direction of the housing of the autonomous mobile robot 12 is changed by 45° through clockwise rotation and controls the display of the display section 24 such that the illumination at the highest intensity is moved in response to the change in the direction of travel to the right (90°) of the direction of the housing.

Accordingly, the display section 24 moves the illumination at the highest intensity from the center portion of the front face relative to the direction of the housing, illuminating the center portion of the right face relative to the direction of the housing at the highest intensity in keeping with the direction of travel. Thereafter, the computation section 22 controls the driving of the driving section 23 such that the autonomous mobile robot 12 starts moving again to the right relative to the direction of the housing (90°) from the passage point P3 and such that the autonomous mobile robot 12 comes to a halt after moving to the passage point P4.

In other words, in the travel pattern E, as illustrated in FIG. 20A, the direction of travel is first presented as the display section 24 illuminates the center portion of the front face relative to the direction of the housing of the autonomous mobile robot 12 at the highest intensity, and then, the change in the direction of travel is presented by moving the illumination at the highest intensity. Accordingly, as illustrated in FIG. 20B, the light-emitting section L3 has the highest display intensity during travel from the passage point P1 to the passage point P2, and the section having the highest display intensity is switched from the light-emitting section L3 over to the light-emitting section L15 from the passage point P2 to the passage point P3. Thereafter, the light-emitting section L15 has the highest display intensity from the passage point P3 to the passage point P4.

At this time, the direction of travel of the autonomous mobile robot 12 is changed by 135°. However, it is only necessary to change the direction of the housing of the autonomous mobile robot 12 by 45° through clockwise rotation by changing the direction through driving such that the direction of the side face of the housing agrees with the direction of travel. That is, it is possible to present a change in the travel route (135°) as a result of the change in travel route of the autonomous mobile robot 12, by the change in the direction of the housing through driving (45°) and the direction change to move the illumination at the highest intensity (90°).

In other words, the travel pattern E is an extension of the movement representation in the travel pattern D. That is, in the travel pattern D, the orientation of the side face of the housing of the autonomous mobile robot 12 does not agree with the orientation of the passage in the case of the passage B. Depending on the representation, therefore, a surrounding individual is likely to have a sense of discomfort because of mismatch of the orientation of the housing even though the direction of travel is indicated. For this reason, in the travel pattern E, the driving section 23 performs the minimum of direction change such that the orientation of the housing of the autonomous mobile robot 12 agrees with the orientation of the passage, and the remaining direction change is compensated for with the representation by the display section 24.

As described above, when the driving control and the display control are generalized such that the side face of the housing agrees with the direction of travel, in the case where the housing of the autonomous mobile robot 12 is in the form of a regular polygon (n-gon), a rotation angle G of the housing and a rotation angle D of the representation are expressed with respect to a rotation angle a of the change in the travel route by the following formula (1).

[Math. 1]

$$D = a \% (360/n)$$

where, $0 \leq a \leq 180°$ $$G = a - D \qquad (1)$$

It should be noted that the representation of rotation by representation in the travel pattern E may be achieved not only in the form of a curve as illustrated in FIGS. 20A and 20B but also in the form of a linear or binary change, an overshoot in the opposite direction, and the like, as in the travel pattern D.

<Calculation Technique of the Display Intensity>

A description will be given below of a calculation technique for the computation section 22 to calculate the display intensity in the display section 24, with reference to FIGS. 21, 22A, 22B, and 22C.

The calculation technique of the display intensity based on a one-dimensional vector will be described with reference to FIG. 21.

FIG. 21 illustrates an example of developing the arrangement positions of the 16 light-emitting sections L1 to L16 arranged circumferentially along the perimeter of the housing of the autonomous mobile robot 12 as illustrated in FIGS. 8A and 8B into a linear arrangement and calculating the intensity of other light-emitting sections on the basis of the distance from a light-emitting section with high display intensity. In other words, in the case where the light-emitting section L3 arranged at the center portion of the front face of the autonomous mobile robot 12 has the highest display intensity, the display intensity up to the light-emitting section L11 arranged at the extreme opposite of the light-emitting section L3 is expressed by a gentle curve that declines in line with a distance from the light-emitting section L3.

It should be noted that a curve as illustrated in FIG. 21 may be tailored to characteristics of the LEDs or display included in the display section 24 and that the display intensity may change linearly.

The calculation technique of the display intensity based on a distance on a two-dimensional plane will be described with reference to FIGS. 22A, 22B, and 22C.

Figure 22A:
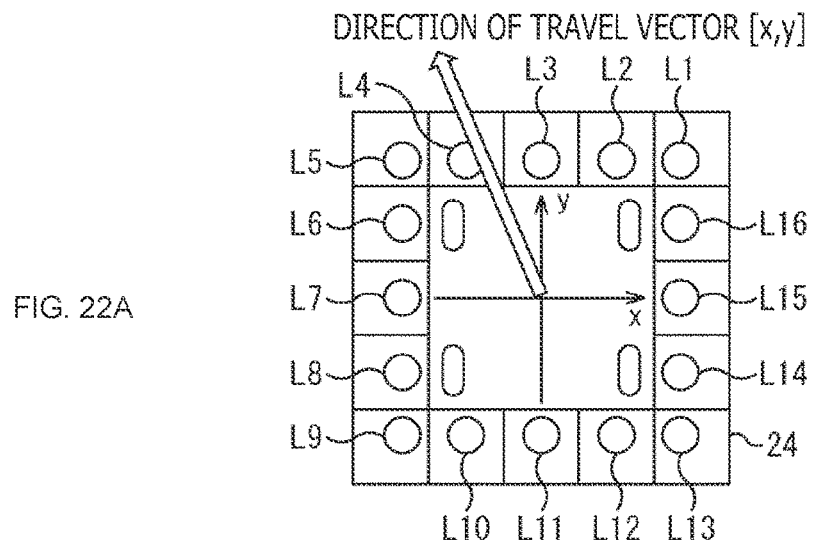
FIGS. 22A, 22B, and 22C depict diagrams describing a technique for calculating a display intensity based on a distance on a two-dimensional plane.
Figure 22B:
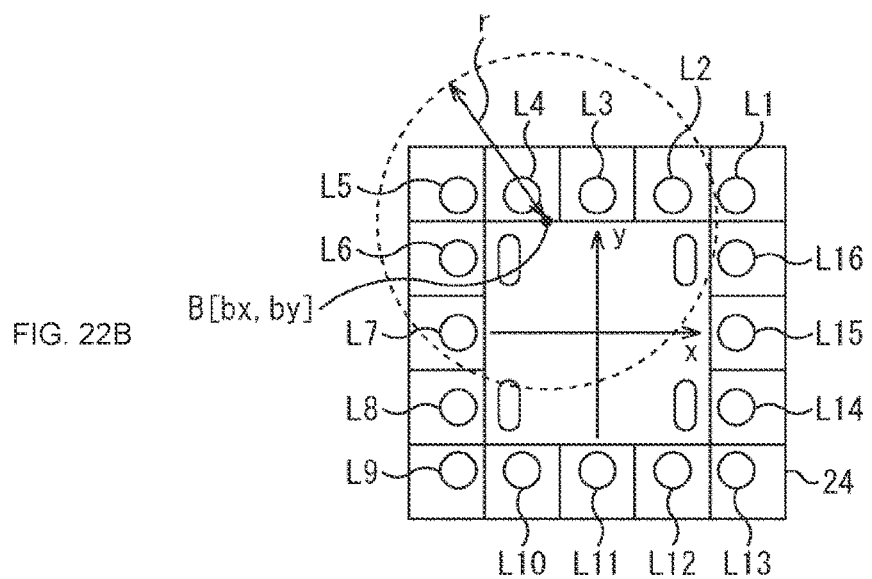
Figure 22C:
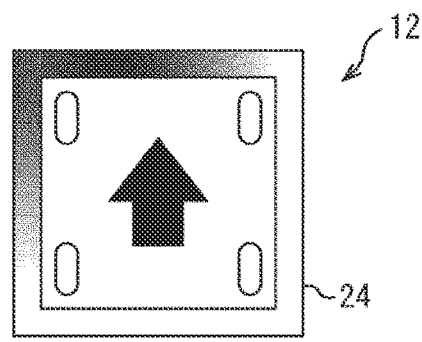

In FIGS. 22A, 22B, and 22C, FIG. 22A illustrates an example of a direction-of-travel vector defined relative to the center of the housing of the autonomous mobile robot 12. In FIGS. 22A, 22B, and 22C, FIG. 22B illustrates an example of a virtual circle virtually generated to have a virtual center point B and a radius r. The virtual center point B lies on the side face of the housing in the direction of travel from the center of the autonomous mobile robot 12. In FIGS. 22A, 22B, and 22C, FIG. 22C illustrates an example of the display section 24 represented by the display intensity based on the virtual circle.

That is, in the case where a direction-of-travel vector as illustrated in FIG. 22A is defined, an intersection between the direction-of-travel vector and the side face of the housing of the autonomous mobile robot 12 is set as the virtual center point B. Then, the display intensity is calculated on the basis of the distance on a two-dimensional plane such that the maximum intensity is at the center of the virtual circle having the radius r around the virtual center point B and such that the intensity declines toward the perimeter of the virtual circle.

For example, as illustrated in FIG. 22B, the light-emitting section L4 including the virtual center point B has the highest intensity and such that the closer to the light-emitting section L4, the higher the display intensity. As a result, the display section 24 performs representation of the direction of travel by gradation such that the higher the display intensity, the darker the gradation, and the lower the display intensity, the lighter the gradation, as illustrated in FIG. 22C.

It should be noted that, for example, in the configuration using a display as the display section 24C as illustrated in FIG. 4C, the display intensity can also be represented on the basis of a three-dimensional distance using a sphere having its center at the virtual center point B, similarly to the description made with reference to FIGS. 22A, 22B, and 22C.

<Variations of Display>

A description will be given of variations for displaying the direction of travel with the display section 24 with reference to FIGS. 23, 24, 25, 26A, 26B, 27A, 27B, 28A, and 28B.

FIG. 23 illustrates variations for displaying the travel route in the case where the display section 24 employing plural LEDs arranged linearly has the forward direction relative to the direction of the housing, i.e. the direction of travel as viewed from above the autonomous mobile robot 12 (light-emitting section L3), have the highest display intensity. It should be noted that three-dimensional representation may be adopted in the configuration using a display as the display section 24C as illustrated in FIG. 4C.

For example, as far as setting of bright spots in the display section 24 is concerned, it is possible to set a single bright spot over all the side faces of the display section 24, set a single bright spot for each side face of the display section 24, or set plural bright spots within a side face of the display section 24. Also, the display section 24 can perform representation of a travel route by bounds, shading/brightness, hue, and flashing. Use of numerous variations as illustrated in FIG. 23 is examined according to a combination of a brightness spot setting and a type of representation of the travel route. Also, only a single representation of a travel route may be selected, or plural representations may be selected and combined.

It should be noted that, in the configuration of the display 24 having a display on the top face of the autonomous mobile robot 12 or a projector as illustrated in FIG. 4B, an arrow, a route, an itinerary, and the like may be displayed. Also, for example, the display section 24 may display an illustration of an eye looking toward the direction of travel.

Further, although the same representation technique is used for all azimuths in the examples illustrated in FIG. 23, details of display different from those of other faces or other areas may be assigned, for example, to each face or a specific area only. That is, in the case where an individual walks behind the autonomous mobile robot 12, the display intended for the individual is assigned to a single face for representation of the direction of travel and progress of the itinerary. Other faces, not visible from the individual, are assigned for the display intended for other individuals in the vicinity, thus allowing for presentation of the travel route with more efficiency.

A description will be given of representation of localization in a space with reference to FIGS. 24 and 25. For example, it is possible to achieve a representation that makes it look as if video is localized in a space by shifting, according to a moving velocity of the autonomous mobile robot 12, the representation at the same velocity as the moving velocity in an opposite direction.

Figure 24:
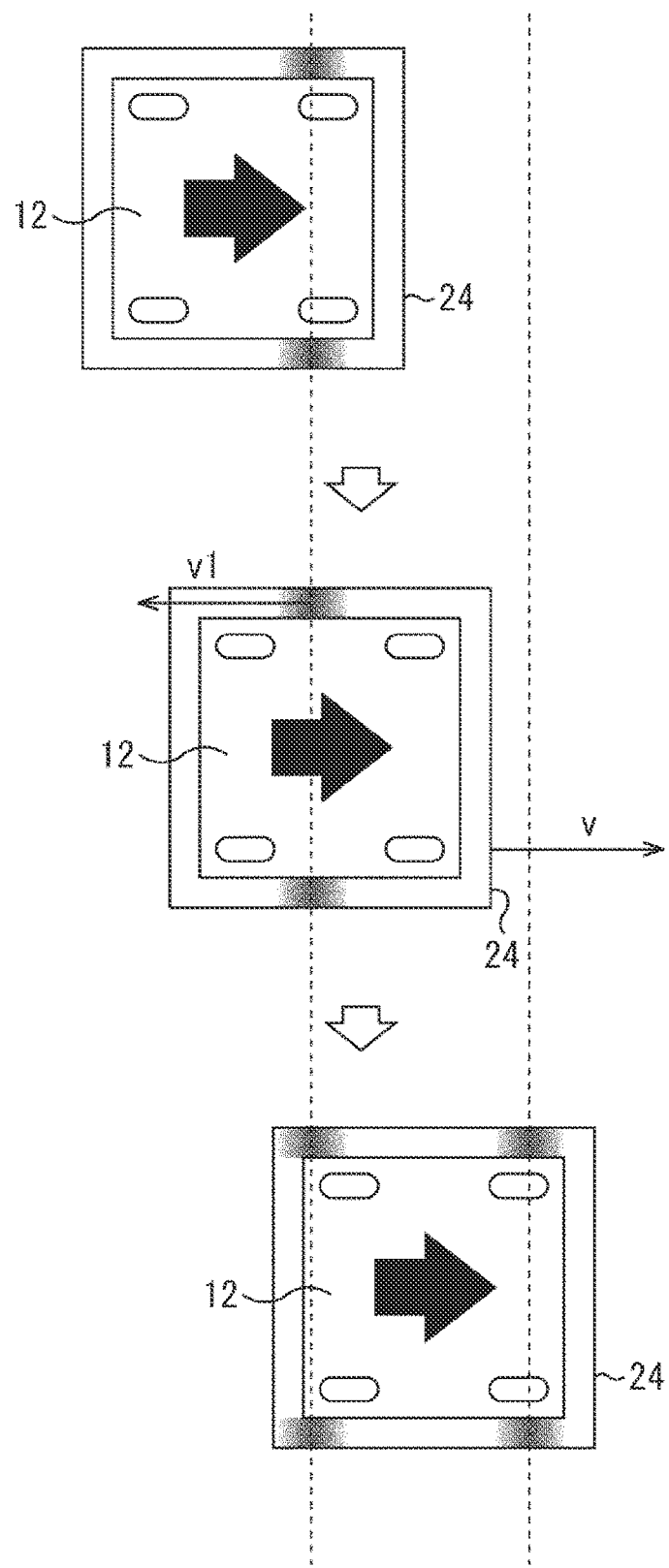
FIG. 24 is a diagram describing representation of localization in a space during straight traveling.

FIG. 24 illustrates an example in which the display section 24 achieves display to make it look as if video is localized in a space during straight traveling of the autonomous mobile robot 12.

As illustrated from top to bottom in FIG. 24, when the autonomous mobile robot 12 moves to the right at a moving velocity v, the display section 24 performs display to make it look as if the display moves to the left at a shifting velocity v1. That is, the shifting velocity v1 by the display section 24 is expressed by using the moving velocity v of the autonomous mobile robot 12 as illustrated in the following formula (2).

[Math. 2]

$$v1 = -V \quad (2)$$

Figure 25:
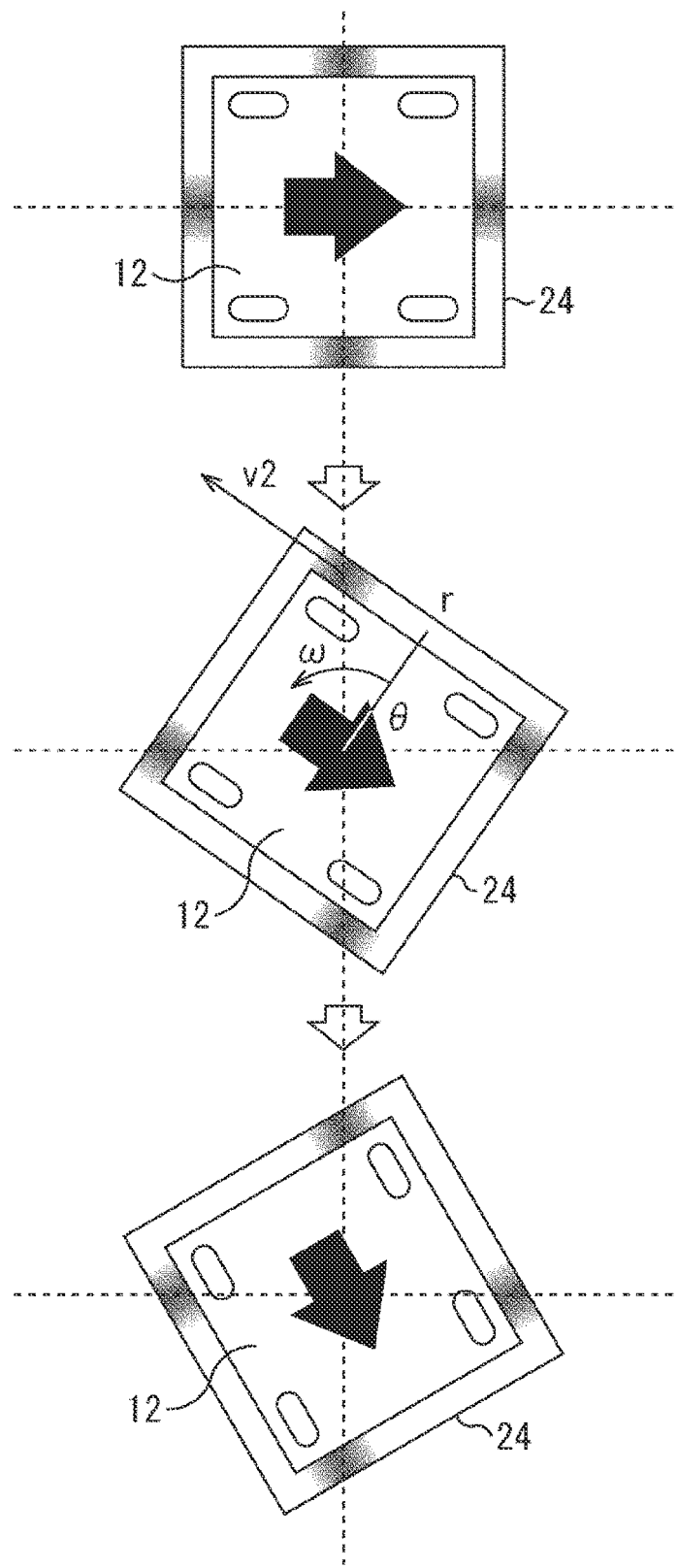
FIG. 25 is a diagram describing representation of localization in a space during turn.

FIG. 25 illustrates an example in which the display section 24 performs display to make it look as if video is localized in a space when the autonomous mobile robot 12 turns.

As illustrated from top to bottom in FIG. 25, when the autonomous mobile robot 12 turns at an angular velocity ω through clockwise rotation, the display section 24 performs display to make it look as if the display rotates counterclockwise at a shifting velocity v2. That is, the shifting velocity v2 by the display section 24 is expressed by using a distance r to the bright spot at the moment on the display section 24 from a turning center and a differential angle θ of the bright spot (minimum of 0° and maximum of 45°) relative to the vertical direction at the moment on the display section 24, as illustrated in the following formula (3).

[Math. 3]

$$v2 = r\omega/(\cos\theta)^2$$

where, $0 < \theta < 45°$ \quad (3)

Figure 26A:
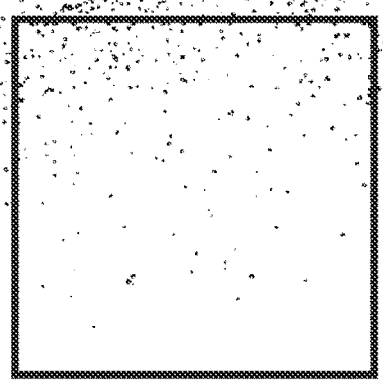
FIGS. 26A and 26B depict diagrams describing display control using particle representations.
Figure 26B:
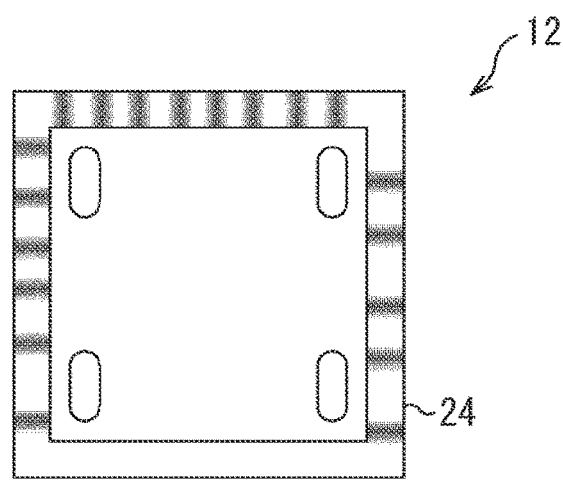

FIGS. 26A and 26B illustrate an example of projecting a particle representation in a space onto a two-dimensional plane.

As illustrated in FIG. 26A, a particle representation is created by shifting, in a constant direction, random noise from a starting point located forward in the direction of travel of the autonomous mobile robot 12. Then, as illustrated in FIG. 26B, the display section 24 illuminates the light-emitting sections at locations corresponding to the particles such that the particles are projected onto the portions intersecting the perimeter when the housing of the autonomous mobile robot 12 is viewed from above, thus allowing for representation of the particles.

For example, the starting point of the particles may be varied in keeping with the direction of travel of the autonomous mobile robot 12, and an amount or velocity of the particles may be varied in keeping with the velocity of the autonomous mobile robot 12. It should be noted that radiation of particles can be represented through simulation on a three-dimensional plane in the configuration using a display as the display section 24C as illustrated in FIG. 4C.

Figure 27A:
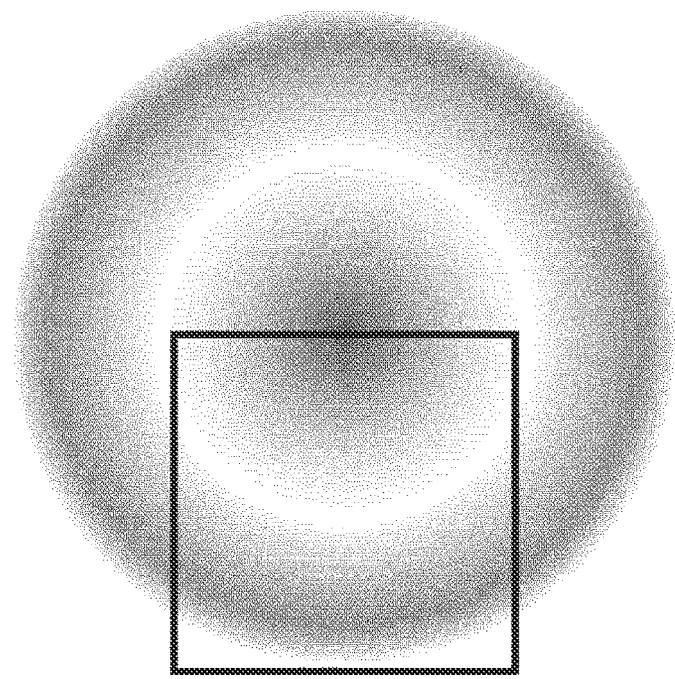
FIGS. 27A and 27B depict diagrams describing display control using ripple representations.
Figure 27B:
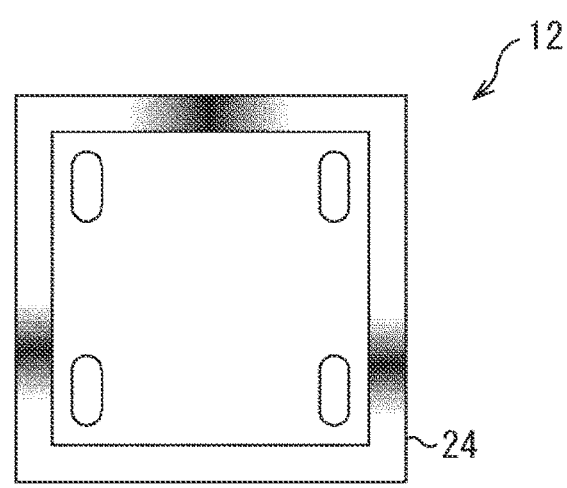

FIGS. 27A and 27B illustrate an example of development of a ripple.

For example, as illustrated in FIG. 27A, two-dimensional and dynamic spread of a ripple is simulated. Then, as illustrated in FIG. 27B, the display section 24 illuminates the light-emitting sections at locations corresponding to the ripple such that the ripple is projected onto the portions intersecting the perimeter when the housing of the autonomous mobile robot 12 is viewed from above, thus allowing for representation of the ripple.

Also, there may be plural ripples, and ripples may occur at plural locations. Such a representation using ripples can be used not only to highlight the direction of travel but also to respond to a surrounding individual during communication and as a method for attracting the attention of a surrounding individual. It should be noted that dynamic spread of a ripple can be represented through simulation on a three-dimensional plane in the configuration using a display as the display section 24C as illustrated in FIG. 4C.

It should be noted that the representations as illustrated in FIGS. 26A 26B, 27A, and 27B may express a magnitude of the moving velocity by periodic movement as a function of time. For example, in the case of a group of graphics such as particles illustrated in FIGS. 26A and 26B, the magnitude of the moving velocity can be expressed by the traveling or falling velocity of particles or the like, and in the case of a ripple as illustrated in FIGS. 27A and 27B, the magnitude of the moving velocity can be expressed by how fast the ripple spreads.

Figure 28A:
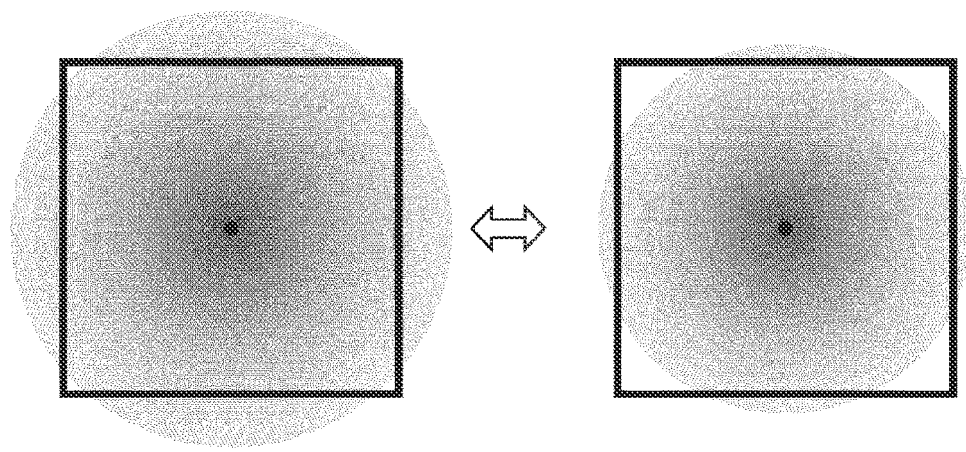
FIGS. 28A and 28B depict diagrams describing display control using circle contraction representations.
Figure 28B:
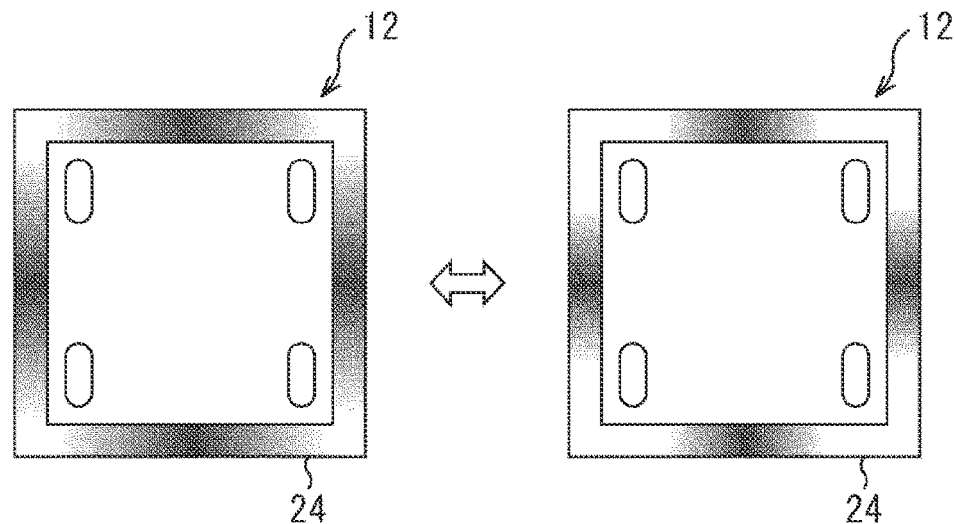

FIGS. 28A and 28B illustrate an example of shrinkage of a virtual circle.

For example, as illustrated in FIG. 28A, a virtual circle is placed at the center of the autonomous mobile robot 12, and the representation of periodically scaling up or down the radius thereof (scaled up on the left/scaled down on the right) is simulated. Then, as illustrated in FIG. 28B, the display section 24 illuminates the light-emitting sections at locations corresponding to the circle such that the circle is projected onto the portions intersecting the perimeter when the housing of the autonomous mobile robot 12 is viewed from above, thus allowing for representation of the circle.

Also, circle's radius, intervals for scale-up and scale-down, expansion/contraction curve, gradation from circle's center to its perimeter, coordinates of circle's center, and the like are among parameters used to determine a virtual circle. Then, the direction and velocity of travel and the like can be represented by adjusting these parameters. For example, it is possible to represent fast breathing and coming fast motion by reducing the intervals for contraction and slow motion by increasing the intervals. Also, it is possible to make representation, by quickening the contraction while moving the circle's center to an edge, so that attention is focused on that direction.

<Reproduction of Preliminary Actions by Display>

A description will be given of an example of reproducing preliminary actions by display with reference to FIGS. 29 to 38.

For example, although the travel route has been presented on the basis of the direction and velocity of travel of the autonomous mobile robot 12 in the above description, the motion about to be made by the autonomous mobile robot 12 has not been reflected in such presentation of the travel route. Accordingly, it is possible to provide further improved sense of security to the surrounding individual by presenting in advance the next motion of the autonomous mobile robot 12. It should be noted that this representation may be switched between forward-only representation and total circumference representation in keeping with the position of the surrounding individual. Alternatively, the representation may be switched to those described so far in keeping with the distance to the surrounding individual.

A description will be given of display control using a travel vector in the travel pattern D as an example of a method for representing the velocity of the autonomous mobile robot 12 with reference to FIGS. 29 to 31.

Figure 29:
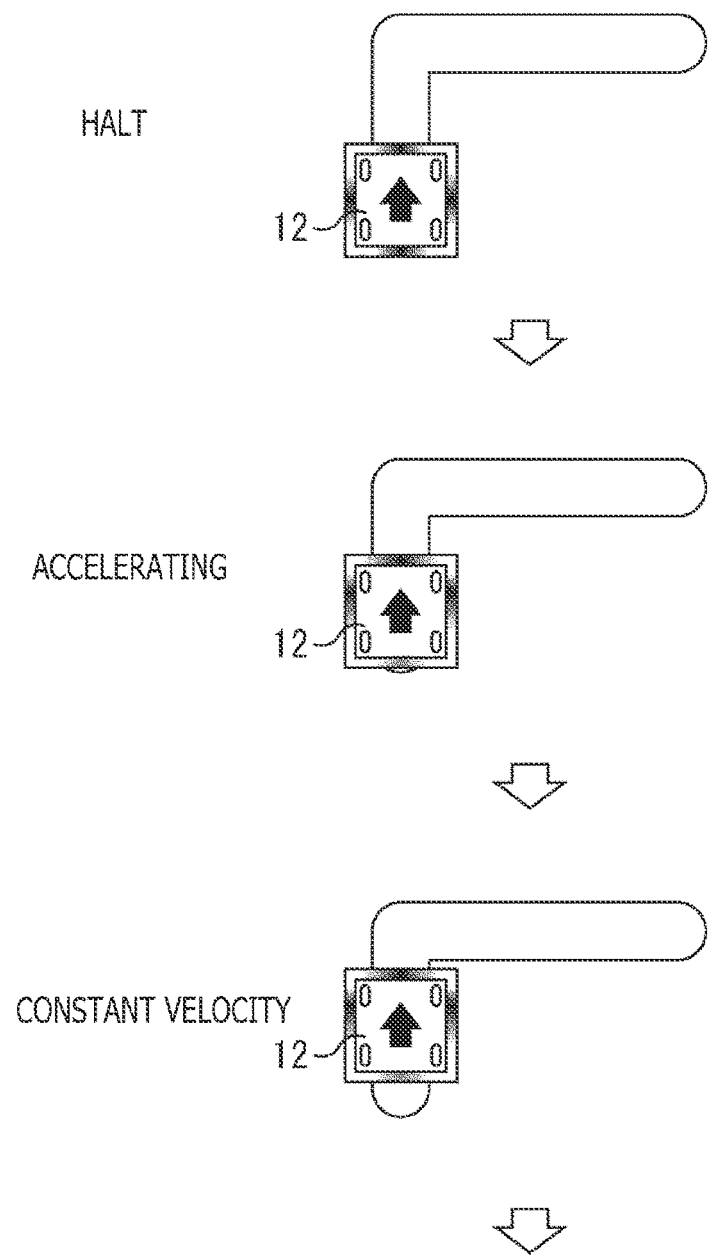
FIG. 29 is a diagram describing display control using a travel vector in the travel pattern D.

For example, when the autonomous mobile robot 12 is at a halt at the passage point P1 as illustrated at the top in FIG. 29, the display section 24 controls the display such that each of the center portions of the four side faces of the autonomous mobile robot 12 is illuminated at the highest intensity. Then, when the autonomous mobile robot 12 is accelerating from the passage point P1 after starting moving as illustrated in the middle in FIG. 29, the display section 24 not only controls the display in keeping with the travel vector such that the center portion of the front face of the autonomous mobile robot 12 is illuminated at the highest intensity but also moves forward the section illuminated at the highest intensity from the two side faces and reduces the intensity on the rear face. Also, when the autonomous mobile robot 12 is moving at a constant velocity as illustrated at the bottom in FIG. 29, and when the autonomous mobile robot 12 is decelerating as illustrated at the top in FIG. 30, the display section 24 performs similar display as during acceleration in keeping with the travel vector.

Figure 30:
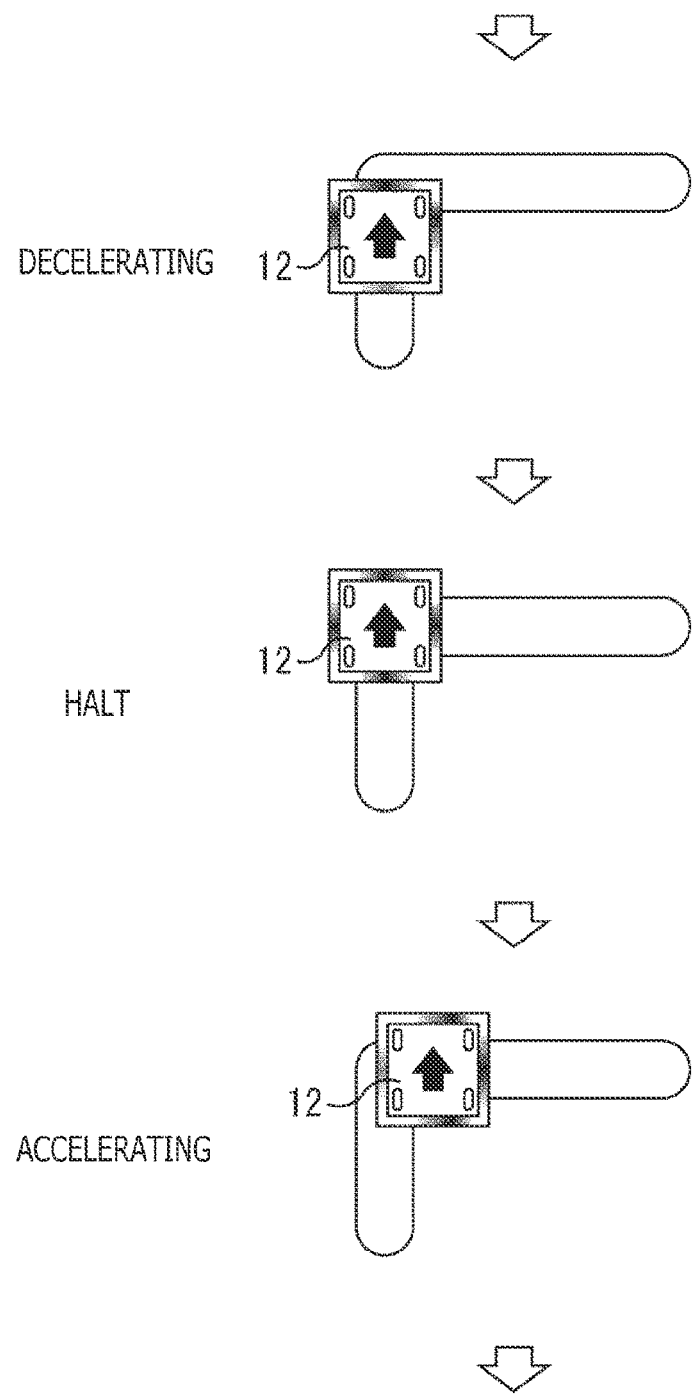
FIG. 30 is a diagram describing display control using a travel vector in the travel pattern D.
Figure 31:
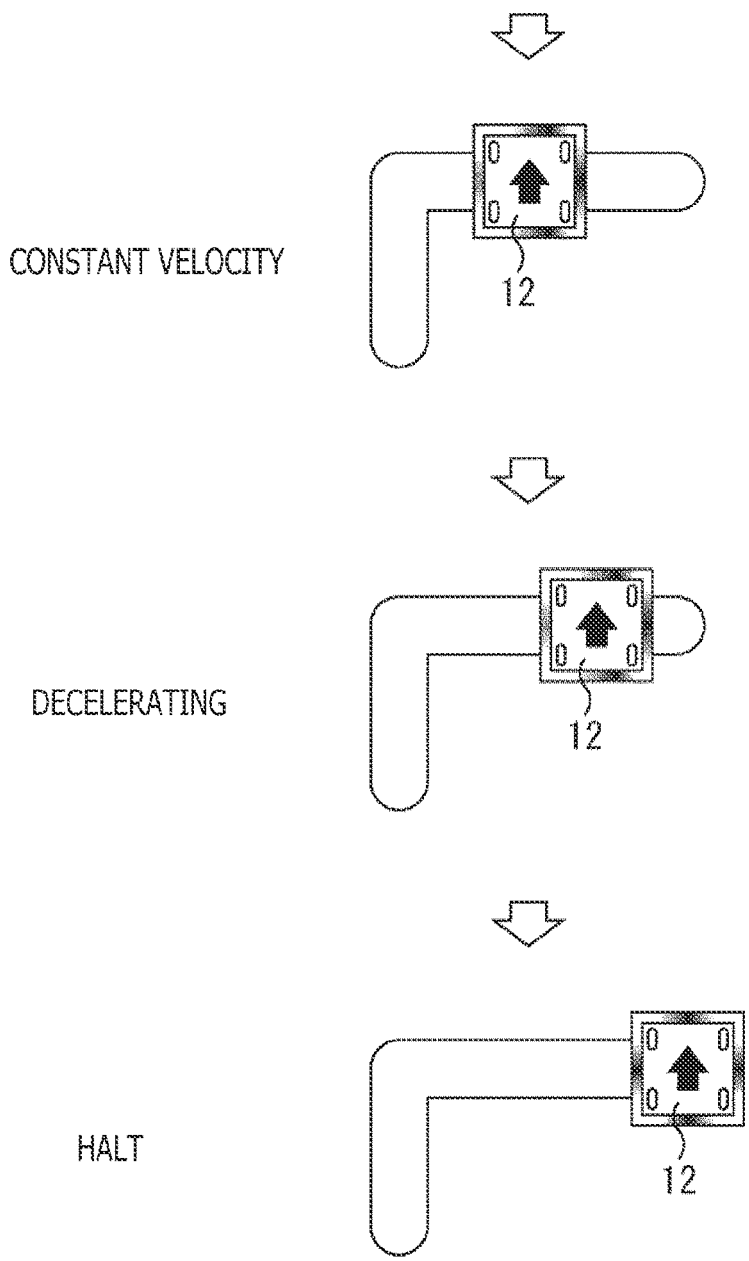
FIG. 31 is a diagram describing display control using a travel vector in the travel pattern D.

Then, when the autonomous mobile robot 12 is at a halt at the passage point P2 as illustrated in the middle in FIG. 30, the display section 24 controls the display such that each of the center portions of the four side faces of the autonomous mobile robot 12 is illuminated at the highest intensity. Hereinafter, the display section 24 performs display in a similar manner in keeping with the travel vector during acceleration as illustrated at the bottom in FIG. 30, during movement at a constant velocity as illustrated at the top in FIG. 31, and during deceleration as illustrated in the middle in FIG. 31. Thereafter, when the autonomous mobile robot 12 comes to a halt at the passage point P4 as illustrated at the bottom in FIG. 31, the display section 24 controls the display such that each of the center portions of the four side faces of the autonomous mobile robot 12 is illuminated at the highest intensity.

A description will be given of display control using an acceleration vector in the travel pattern D as an example of a method for representing the velocity of the autonomous mobile robot 12 with reference to FIGS. 32 to 34.

Figure 32:
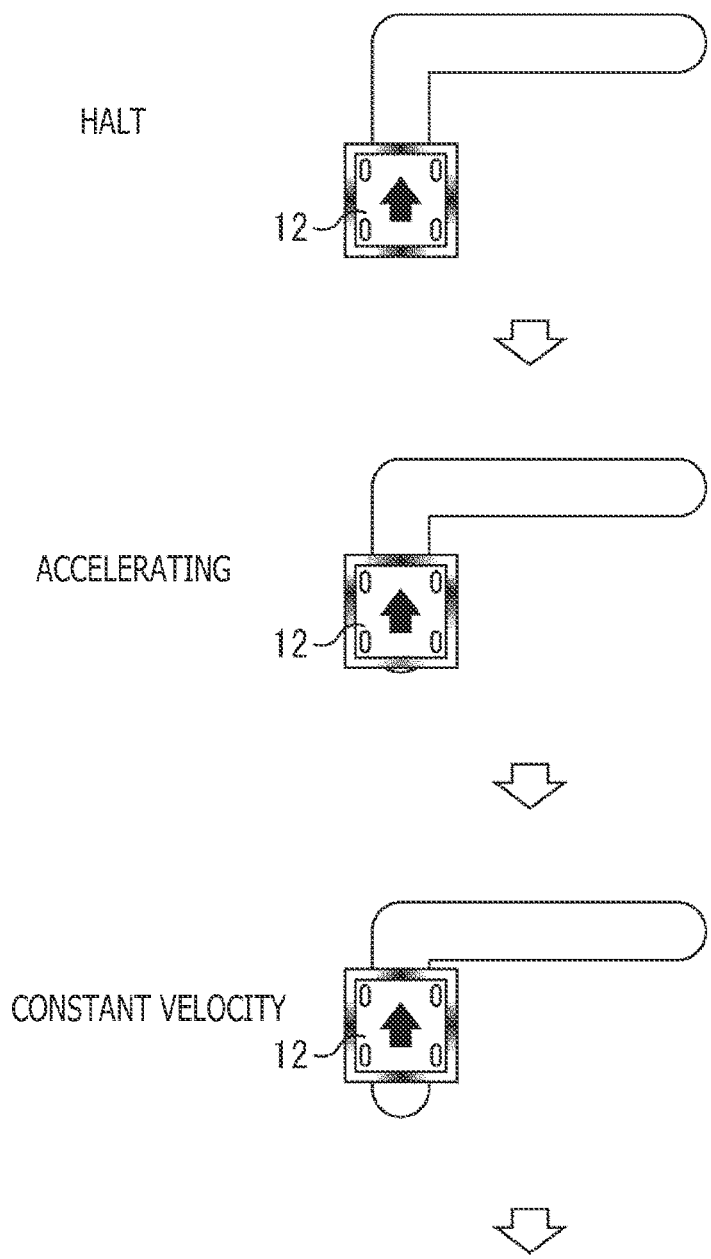
FIG. 32 is a diagram describing display control using an acceleration vector in the travel pattern D.

For example, when the autonomous mobile robot 12 is at a halt at the passage point P1 as illustrated at the top in FIG. 32, the display section 24 controls the display such that each of the center portions of the four side faces of the autonomous mobile robot 12 is illuminated at the highest intensity. Then, when the autonomous mobile robot 12 is accelerating from the passage point P1 after starting moving as illustrated in the middle in FIG. 32, the display section 24 not only controls the display in keeping with the acceleration vector such that the center portion of the front face of the autonomous mobile robot 12 is illuminated at the highest intensity but also moves forward the section illuminated at the highest intensity from the two side faces forward and reduces the intensity on the rear face.

Thereafter, when the autonomous mobile robot 12 switches to movement at a constant velocity, the display section 24 controls the display such that each of the center portions of the four side faces of the autonomous mobile robot 12 is illuminated at the highest intensity in keeping with the acceleration vector as illustrated at the bottom in FIG. 32. Then, when the autonomous mobile robot 12 decelerates ahead of the passage point P2, the display section 24 not only controls the display in keeping with the acceleration vector such that the center portion of the rear face of the autonomous mobile robot 12 is illuminated at the highest intensity but also moves forward the section illuminated at the highest intensity from the two side faces and reduces the intensity on the front face as illustrated at the top in FIG. 33.

Figure 33:
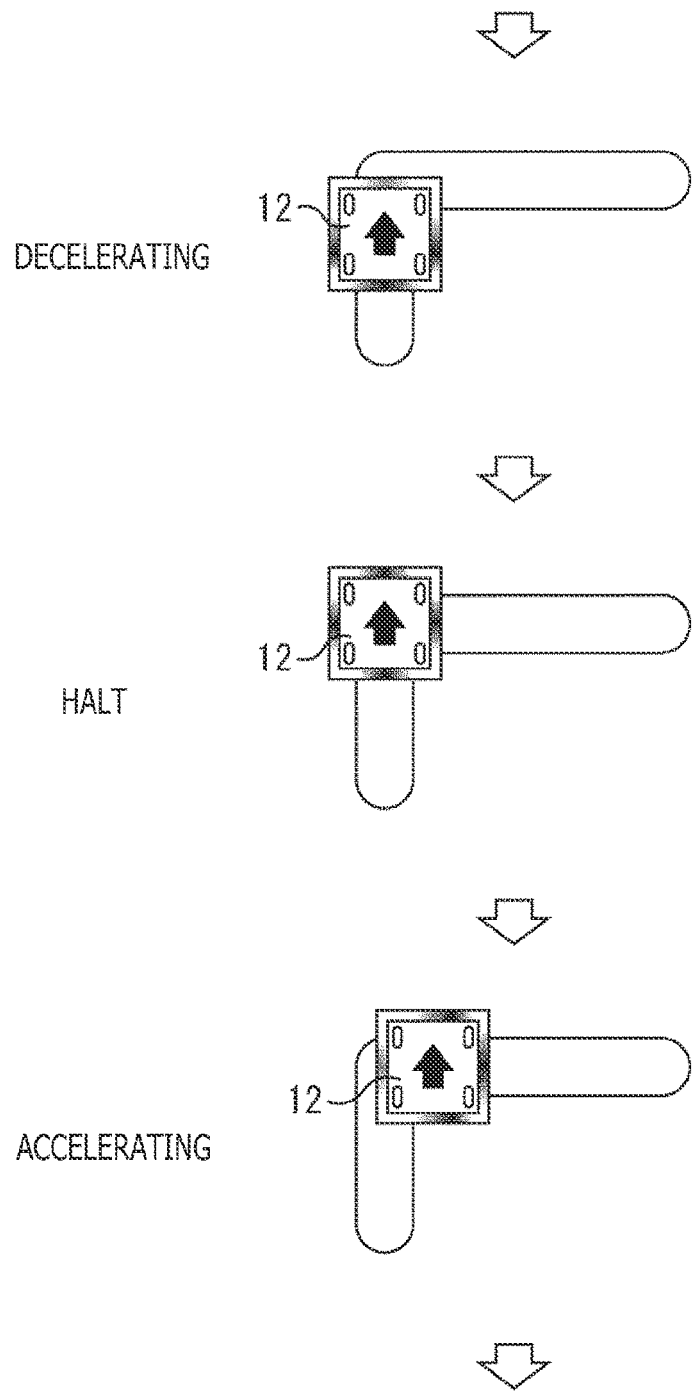
FIG. 33 is a diagram describing display control using an acceleration vector in the travel pattern D.
Figure 34:
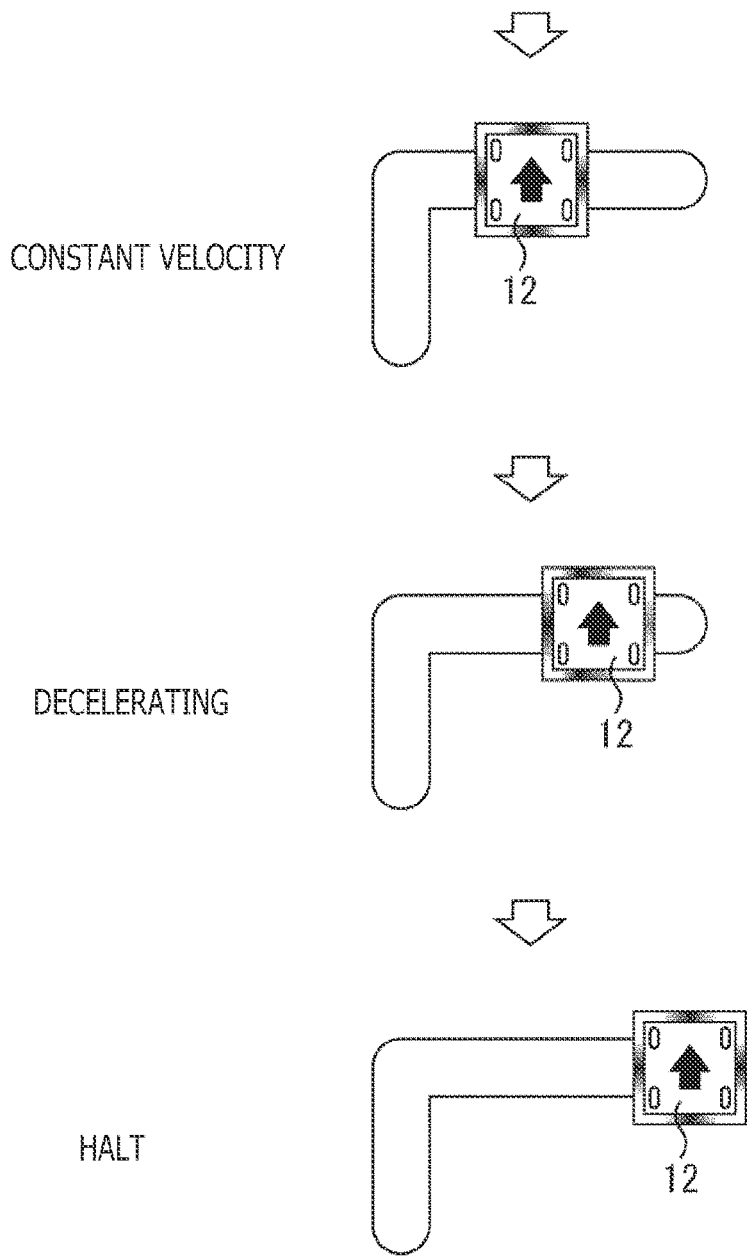
FIG. 34 is a diagram describing display control using an acceleration vector in the travel pattern D.

Then, when the autonomous mobile robot 12 is at a halt at the passage point P2 as illustrated in the middle in FIG. 33, the display section 24 controls the display such that each of the center portions of the four side faces of the autonomous mobile robot 12 is illuminated at the highest intensity. Hereinafter, the display section 24 performs display in a similar manner in keeping with the acceleration vector during acceleration as illustrated at the bottom in FIG. 33, during movement at a constant velocity as illustrated at the top in FIG. 34, and during deceleration as illustrated in the middle in FIG. 34. Thereafter, when the autonomous mobile robot 12 comes to a halt at the passage point P4 as illustrated at the bottom in FIG. 34, the display section 24 controls the display such that each of the center portions of the four side faces of the autonomous mobile robot 12 is illuminated at the highest intensity.

As described above, the autonomous mobile robot 12 controls the display in keeping with an acceleration vector, thus allowing, for example, for the representation to be developed in the orientation opposite to the direction of travel during deceleration and making it possible to represent, in advance, the coming halt of the autonomous mobile robot 12.

Incidentally, even if an acceleration vector is used as described above, the travel route of the autonomous mobile robot 12 cannot be represented in advance when the autonomous mobile robot 12 turns in a curved manner or at right angle, for example. For this reason, in the case where the course to be traveled is known in advance, it is preferred that a preliminary action be communicated to surrounding individuals by displaying in advance in which direction the autonomous mobile robot 12 is to turn next instead of the current direction of travel.

Figure 35:
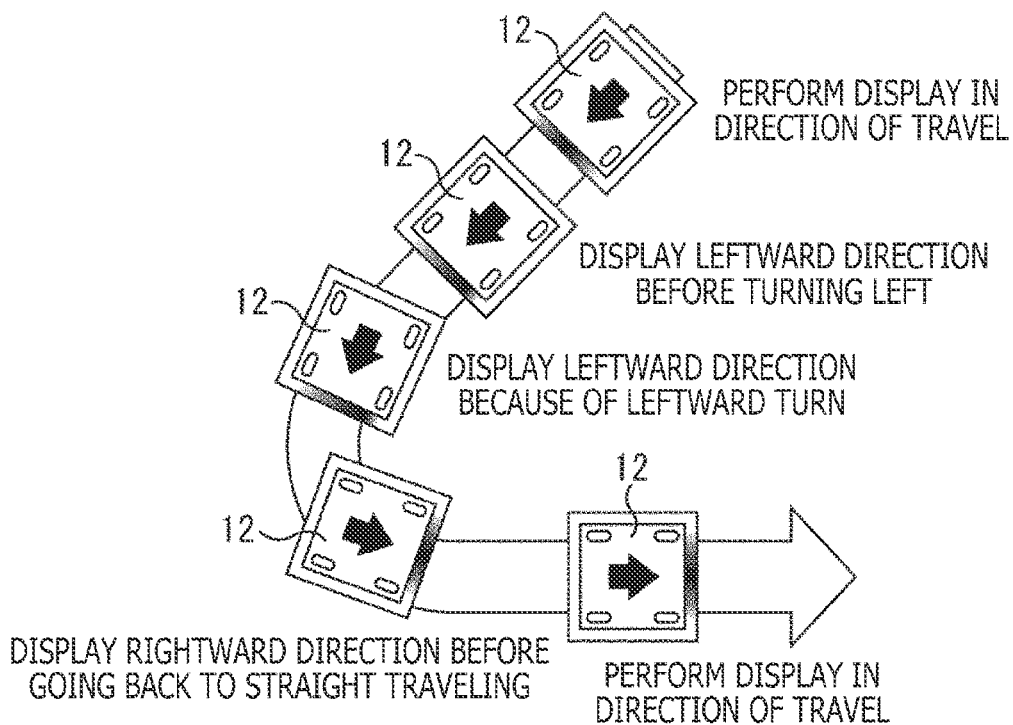
FIG. 35 is a diagram describing display control that performs representation of preliminary actions.
Figure 36:
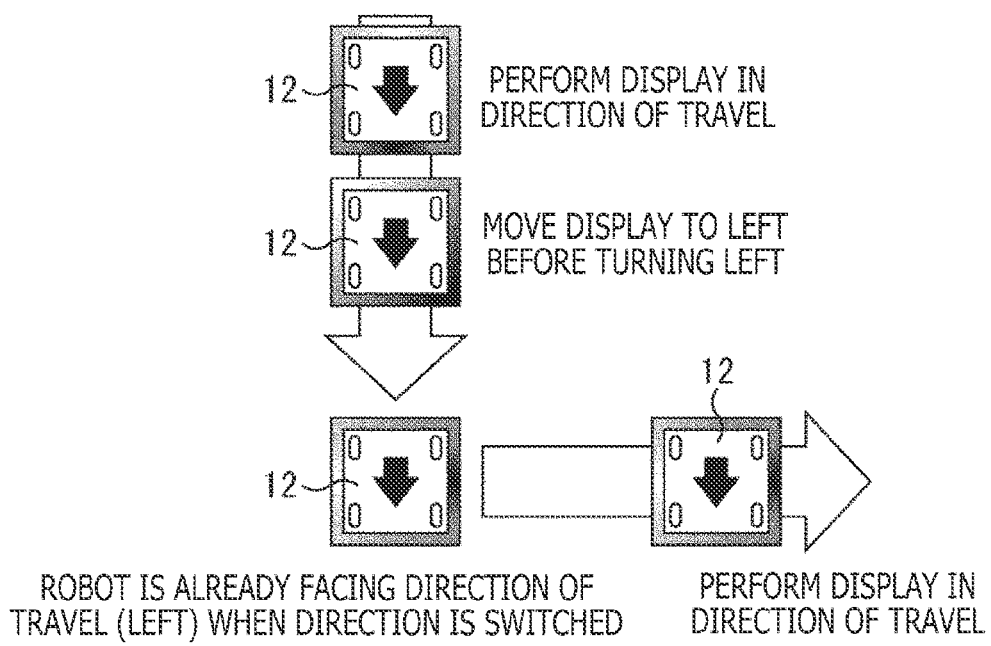
FIG. 36 is a diagram describing display control that performs representation of preliminary actions.

For example, FIG. 35 illustrates an example of display control in which preliminary actions are represented in the travel pattern C, and FIG. 36 illustrates an example of display control in which preliminary actions are represented in the travel pattern D.

For example, in the travel pattern C, the housing of the autonomous mobile robot 12 always faces the direction of travel. Therefore, display may always be fixed and performed on the front. As illustrated in FIG. 35, however, display control in which the section illuminated at the highest intensity is moved from the center portion to the left side once before the autonomous mobile robot 12 turns to the left in a curved manner and is brought back to the center portion before the turn is completed is preferred.

Also, in the travel pattern D, the housing of the autonomous mobile robot 12 basically does not turn. As a result, the turn is represented by display alone. Therefore, as illustrated in FIG. 36, the housing is faced to the left in advance before turning to the left, and when the direction of travel is switched, the housing is already faced to that direction. This makes it possible for surrounding individuals to know in which direction the autonomous mobile robot 12 will advance next before the autonomous mobile robot 12 actually moves.

Also, in addition to representation of preliminary actions as described with reference to FIGS. 35 and 36, representation of preliminary actions may be applied, for example, when the autonomous mobile robot 12 is on standby and not moving.

For example, it is possible to present the travel route in a preliminary manner before the autonomous mobile robot 12 starts traveling, by presenting the direction of travel when the autonomous mobile robot 12 is physically at a halt at the passage point P1 in the passage A as illustrated in FIGS. 37 and 38. Also, it is possible to perform representation to present the next direction of travel by turning the direction of travel while the autonomous mobile robot 12 is at a halt at the passage point P2.

Also, in the case where there is something to which attention is desired to be directed beyond the passage point P4 after the autonomous mobile robot 12 comes to a halt at the passage point P4, the display section 24 may control the display such that the center portion of the front face of the autonomous mobile robot 12 is illuminated at the highest intensity as during travel, instead of controlling the display such that each of the center portions of the four side faces of the autonomous mobile robot 12 is illuminated at the highest intensity as while on standby.

<Display Method During Coordination Between Plural Robots>

A description will be given of a display method during coordination between plural robots with reference to FIGS. 39 and 40.

Figure 39:
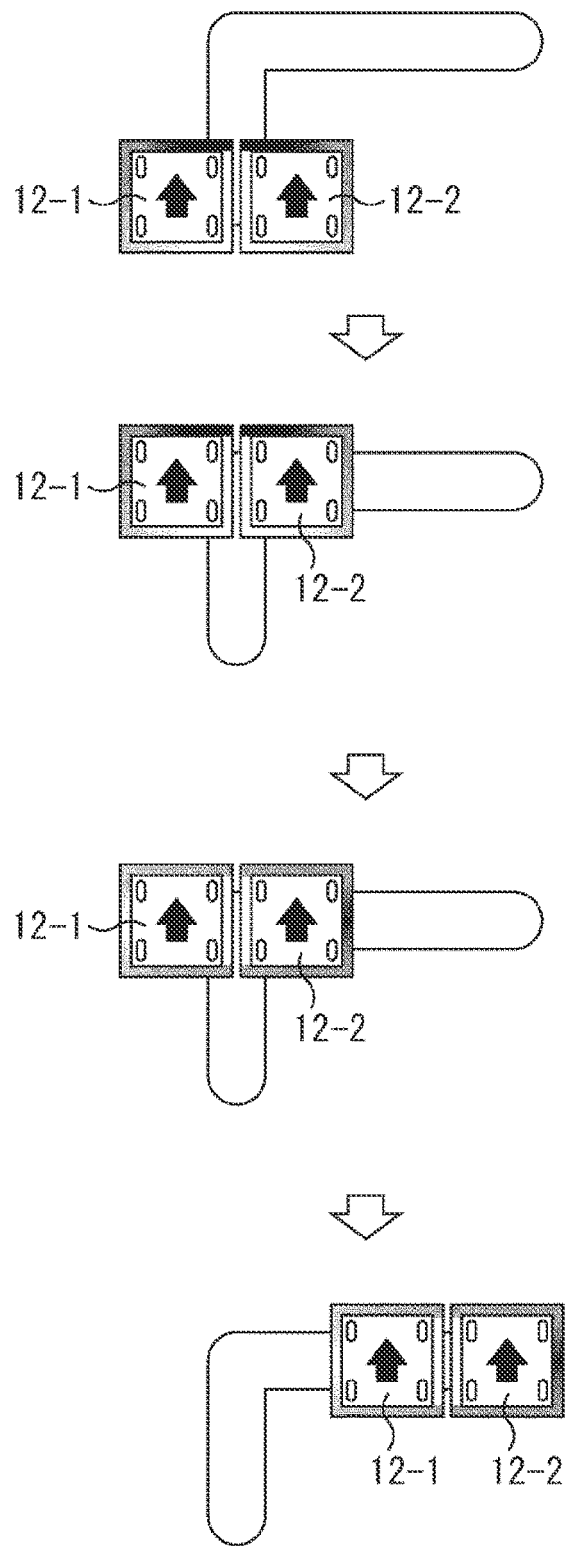
FIG. 39 is a diagram describing display control during coordinated movement of two robots.
Figure 40:
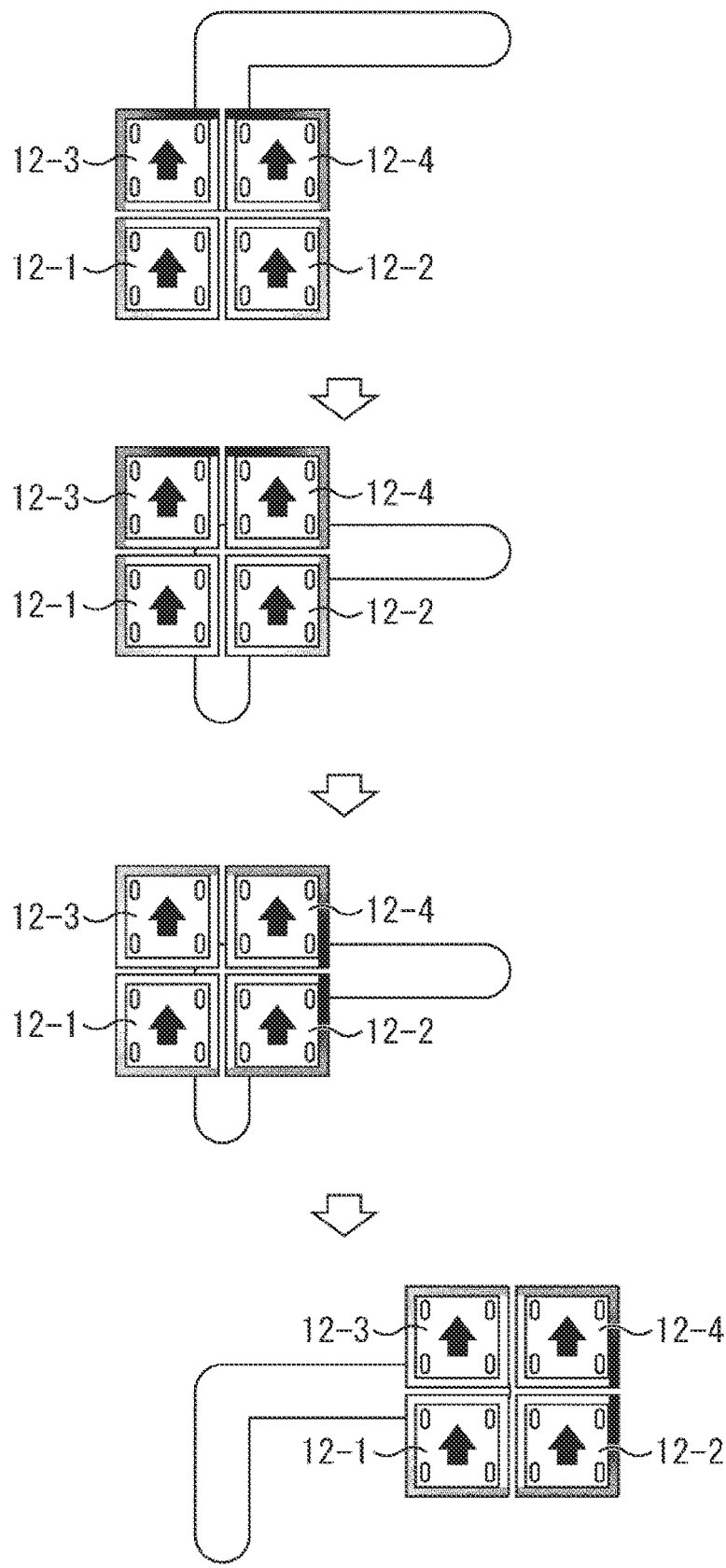
FIG. 40 is a diagram describing display control during coordinated movement of four robots.

FIG. 39 illustrates an example of presenting a travel route when two autonomous mobile robots 12-1 and 12-2 move in a coordinated manner, and FIG. 40 illustrates an example of presenting a travel route when four autonomous mobile robots 12-1 to 12-4 move in a coordinated manner.

For example, the plural autonomous mobile robots 12 can move in a coordinated manner as a larger autonomous mobile robot, as they are physically connected together. Also, in the case where the autonomous mobile robots 12 are equipped with proximity sensors, they can move in a coordinated manner as a larger autonomous mobile robot without being physically connected.

As described above, it is possible to present a travel route during movement of the plural autonomous mobile robots 12 in a coordinated fashion in a manner similar to that during movement of the single autonomous mobile robot 12 described above. At this time, the side faces of the autonomous mobile robots 12 in contact are invisible from the vicinity and can be made unilluminating as illustrated in FIGS. 39 and 40. Also, the representation of continuous portions of the side faces of the autonomous mobile robots 12 can be compensated for by making them look as if they are continuous as illustrated in FIGS. 39 and 40.

It should be noted that in the case where the autonomous mobile robots 12 incorporate illuminance sensors or cameras, the side faces of the autonomous mobile robots 12 in contact, i.e., the unilluminating side faces, can be used for optical communication between the autonomous mobile robots 12.

As described above, various methods of presenting the travel route described above are applicable not only to the single autonomous mobile robot 12 but also to the plural autonomous mobile robots 12 moving in a coordinated fashion.

<Synchronous/Asynchronous Process>

As described above, even if the plural autonomous mobile robots 12 do not move as a single autonomous mobile robot, it is possible to present the coordination between the autonomous mobile robots 12 to surrounding individuals. Specifically, by matching representation timings of flashing, ripple, localization in space, particles, and the like that change over time, it is possible to notify the surrounding individuals of the effect that synchronization is achieved even if the plural autonomous mobile robots 12 are physically apart. Also, it is possible to present the fact that a motion different from those of the plural other autonomous mobile robots 12 will be made by daring to be out of synchronism.

<Learning of the Travel Pattern and Classification into a Specific Profile>

For example, adaptation between the travel mode and the travel pattern as illustrated in FIG. 6 may be optimized in keeping with proficiency of a surrounding individual. For example, in the case where it is determined unnecessary to turn the housing of the autonomous mobile robot 12 on the grounds of duration of contact with a specific individual and his or her behavior, one example being that an action is regarded as being recognized once it is viewed, only the travel patterns D and E, and not the travel patterns B and C, may be adopted.

Further, in the case where an individual such as a child or an elderly person is regarded as lacking proficiency, the travel patterns D and E may dare not be adopted, and instead, other travel patterns may be used for travelling. Also, in the case where the orientation of an individual's face or his or her line of sight can be detected, display may be performed only when the individual is looking at the autonomous mobile robot 12.

<Application to Configurations Other than Omnidirectional Mobile Robot>

The presentation of a travel route as described above is partially applicable, for example, to configurations using a mobile mechanism not capable of a pivot turn or lateral motion or a mobile mechanism not capable of omnidirectional motion, in addition to configurations using the mecanum wheels 72 that permit omnidirectional motion as illustrated in FIG. 3.

For example, in the configuration having the display section 24 attached to the perimeter of the autonomous mobile robot 12 that moves similarly to a conventional automobile, it is possible to apply the travel patterns B and C illustrated in FIG. 6 by using a curve having a large curvature in place of a pivot turn. Also, in this configuration, the travel pattern D is not applicable in all cases. However, the above presentation of a travel route may be applied in a manner conformable to constraints on movement of the autonomous mobile robot 12, one example of which being the application of a representation for changing the direction of travel by 180° in the case of receding or the like.

<Representation of Focusing of Attention Using Audio Output>

For example, the presentation of a travel route as described above is primarily used to notify surrounding individuals and other autonomous mobile robots 12. However, a situation may arise where surrounding individuals fail to notice the presence of the autonomous mobile robot 12. Under such circumstances, the autonomous mobile robot 12 can make the surrounding individual aware of its presence by producing a sound from a speaker provided in the environment where the autonomous mobile robot 12 is used or from the wearable device worn by the surrounding individual.

For example, the determination as to whether a surrounding individual is aware of the autonomous mobile robot 12 can be made, for example, by using the RGB camera 32 (FIG. 2) of the autonomous mobile robot 12, the sensor module 14 in FIG. 1, the camera built into the wearable device, and the like and on the basis of the orientation of the individual's face or the direction of his or her line of sight. Then, in the case where it is determined that the autonomous mobile robot 12 is not in sight of the surrounding individual, or in the case where the surrounding individual moves in a manner that may lead to collision with the autonomous mobile robot 12 on the basis of positional information regarding the individual, it is possible to represent focusing of attention by using audio output.

<Change in Display Intensity in Keeping with Human and Ambient Light>

For example, it is likely that the display of the display section 24 becomes difficult to see depending on the environment in which the autonomous mobile robot 12 is used. For example, therefore, in the case where the autonomous mobile robot 12 is used in an environment with high illuminance, peak luminance of the display, the LED array, the projector, or the like included in the display section 24 may be increased in keeping with the illuminance of the environment.

Also, it is likely that a surrounding individual may not readily notice the autonomous mobile robot 12 depending on the distance and a viewing angle to the autonomous mobile robot 12 even if they are in the same space. For example, therefore, in the case where the surrounding individual is far or outside the field of view of the autonomous mobile robot 12, the peak luminance of the display section 24 may be increased. Alternatively, in the case where the autonomous mobile robot 12 readily comes into view of the surrounding individual because he or she is short such as a child, or in the case where an individual highly sensitive to light is present, the peak luminance of the display section 24 may be reduced.

Further, in the case where a surrounding individual is present in the vicinity of the autonomous mobile robot 12 when the representation as described with reference to FIG. 6 is used during a turn of the autonomous mobile robot 12, priority may be given to eye contact with the surrounding individual rather than the representation of turn by determining whether or not the surrounding individual is aware of the autonomous mobile robot 12 and whether or not the surrounding individual knows about the autonomous mobile robot 12.

<Representation Method in an Emergency Situation or in a Poor Environment>

For example, in the case where a surrounding individual is in the risk of coming into contact with the autonomous mobile robot 12, the luminance of the display section 24 may be increased to a maximum level, and the surrounding individual may be notified by a speaker or the like. Further, the autonomous mobile robot 12 may make the surrounding individual aware of its presence by making a spin turn at high speed and daring to make a loud noise. Also, in the case where it is difficult to detect the presence or absence of individuals in the vicinity with sensors of the autonomous mobile robot 12 because of an extremely bright ambient condition or the like, the display section 24 may perform display to be on the safe side.

In addition to the above, in the case where an abnormality such as a defect, incapability of motion, and a battery condition of the autonomous mobile robot 12 is desired to be notified to surrounding individuals, display can be similarly performed with the highest luminance as described above. Also, in the case of an emergency even with individuals present in the vicinity, the mode may be forcefully switched to one in which the autonomous mobile robot 12 moves in parallel such as the travel pattern A or D, among the patterns described with reference to FIG. 6.

Also, in the case where the autonomous mobile robot 12 travels through a narrow passage and it is difficult for surrounding individuals to recognize the autonomous mobile robot 12, it is possible to deploy a representation over a wide range and not just in the vicinity of the autonomous mobile robot 12, by adjusting the angle of the display section 24 such as a projector or an LED array. At this time, the autonomous mobile robot 12 may switch to a representation that is easier to be noticed. In the case of an environment similarly unfavorable to the surrounding individual because of low ambient illuminance, the display section 24 may be used to aid in ensuring safety such as illuminating the feet of the surrounding individual.

As described above, surrounding individuals can grasp the motion of the autonomous mobile robot 12 from any direction if the display section 24 is installed to the faces of the autonomous mobile robot 12 oriented in all azimuths regardless of the orientation of the direction of travel. Also, the surrounding individuals can predict the motion of the autonomous mobile robot 12 in advance, thus contributing to a sense of security felt by surrounding individuals and ensuring reduced initial learning cost of a user of the autonomous mobile robot 12.

Also, the autonomous mobile robot 12 employs an optimal movement method where there is nobody in the vicinity, thus making it possible to optimize the movement cost of the battery and the like and take advantage of a mechanism of the autonomous mobile robot 12. Also, the autonomous mobile robot 12 eliminates the need to physically change the direction by indicating, by display, the direction change even where there is a surrounding individual in the vicinity, thus ensuring improved responsiveness and optimizing the movement.

In particular, in the case where the details of movement are such that the autonomous mobile robot 12 follows the surrounding individual, the autonomous mobile robot 12 can provide an improved sense of security to surrounding individuals by traveling in such a manner that the forward direction of travel agrees with the front face of the housing of the autonomous mobile robot 12 as does a conventional automobile and the like. Further, a similar representation technique can be used when the plural autonomous mobile robots 12 move in a coordinated manner.

Here, the above series of processes can be performed by hardware or software. In the case where the series of processes is performed by software, the program included in the software is installed to a general-purpose computer or the like.

Here, the processes to be performed by the computer according to the program are not necessarily required to be performed chronologically according to the order described in the present specification. That is, the processes to be performed by the computer according to the program include those performed in parallel or individually (e.g., parallel processing or object-based processing).

Also, the program may be processed not only by a single computer (processor) but also by plural computers in a distributed manner. Further, the program may be transferred to a remote computer for execution.

Further, the system in the present specification refers to a set of plural constituent elements (e.g., apparatuses, modules (parts)), and it does not matter whether all the constituent elements are accommodated in the same housing. Therefore, plural apparatuses accommodated in different housings and connected via a network and an apparatus whose plural modules are accommodated in a single housing are both systems.

Also, for example, a component described as an apparatus (or a processing section) may be divided into plural apparatuses (or processing sections). Conversely, components described above as plural apparatuses (or processing sections) may be combined into a single apparatus (processing section). Also, components other than those described above may be added to the component of each of the apparatuses (each of the processing sections). Further, as long as the components or operation of the system as a whole substantially remains the same, some components of a certain apparatus (or processing section) may be included in the components of another apparatus (or another processing section).

Also, for example, the present technology can adopt a cloud computing configuration in which one function is processed by plural apparatuses in a shared and cooperative manner via a network.

Also, for example, the above program can be executed in any apparatus. In that case, it is acceptable as long as the apparatus has necessary functions (e.g., functional blocks) to acquire necessary information.

Also, for example, each step described in the above flowchart can be performed not only by a single apparatus but also by plural apparatuses in a shared manner. Further, in the case where a single step includes plural processes, the plural processes included in that single step can be performed not only by a single apparatus but also by plural apparatuses in a shared manner. In other words, plural of processes included in a single step can be performed as processes of plural steps. Conversely, a process described as plural steps can be combined into a single step and performed.

It should be noted that the program to be executed by the computer may perform the processes of the steps defining the program chronologically according to the order described in the present specification, in parallel, or individually when invoked. That is, unless inconsistency arises, the processes of the respective steps may be performed in an order different from the above. Further, the processes of the steps defining this program may be performed in parallel to those of another program or combined and performed together with those of another program.

It should be noted that the plural present technologies described in the present specification can be carried out independently of each other and alone unless inconsistency arises. Of course, any number of the plural present technologies can be carried out in combination. For example, some or all of the present technologies described in one of the embodiments can be carried out in combination with some or all of the present technologies described in another embodiment. Also, some or all of any of the present technologies described above can be carried out together with other technologies not described above.

Examples of Combinations of Components

It should be noted that the present technology can also have the following configurations.

(1)

A mobile object control apparatus including:

a degree-of-relation deciding section configured to decide a degree of relation with a surrounding individual in the vicinity of a mobile object; and a setting section configured to set a travel mode associated with a process performed by a driving section that moves the mobile object and a process performed by an output section that outputs a representation for presenting a travel route of the mobile object, on the basis of the degree of relation.

(2)

The mobile object control apparatus of feature (1), in which, in the case where the mobile object moves together with the surrounding individual, the setting section sets a travel mode in which the driving section changes a direction of a housing of the mobile object during change of the travel route for traveling.

(3)

The mobile object control apparatus of feature (2), in which the output section performs presentation of a direction of travel of the moving object but does not perform representation of the change of the travel route.

(4)

The mobile object control apparatus of feature (2), in which the output section performs neither presentation of a direction of travel of the moving object nor representation of the change of the travel route.

(5)

The mobile object control apparatus of feature (1), in which, in the case where, although the mobile object does not move together with the surrounding individual, the surrounding individual that is able to visually recognize the mobile object is present, the setting section sets a travel mode in which the output section performs presentation of a direction of travel of the moving object and performs representation of change of the direction of the travel during change of the travel route of the mobile object for traveling.

(6)

The mobile object control apparatus of feature (5), in which the driving section moves the mobile object while at the same time maintaining a direction of a housing of the mobile object constant during the change of the travel route of the mobile object.

(7)

The mobile object control apparatus of feature (5), in which the driving section changes a direction of a housing of the mobile object during change of the travel route of the mobile object.

(8)

The mobile object control apparatus of feature (1), in which, in the case where the mobile object does not move together with the surrounding individual and a surrounding individual that is able to visually recognize the mobile object is absent, the setting section sets a travel mode in which the output section does not perform representation of any direction of travel or direction change to present the travel route of the mobile object and the driving section does not change a direction of a housing of the mobile object for traveling.

(9)

The mobile object control apparatus of any one of features (1) to (8), in which the output section includes a display section that performs display over an entire perimeter of side faces of the housing of the mobile object.

(10)

A mobile object control method including:

by a mobile object control apparatus that controls movement of a mobile object, deciding a degree of relation with an individual in the vicinity of the mobile object; and setting a travel mode associated with a process performed by a driving section that moves the mobile object and a process performed by an output section that outputs a representation for presenting a travel route of the mobile object, on the basis of the degree of relation.

(11)

A program causing a computer of a mobile object control apparatus that controls movement of a mobile object to perform mobile object control, the mobile object control including:

deciding a degree of relation with an individual in the vicinity of the mobile object; and setting a travel mode associated with a process performed by a driving section that moves the mobile object and a process performed by an output section that outputs a representation for presenting a travel route of the mobile object, on the basis of the degree of relation.

It should be noted that the present embodiments are not limited to those described above and may be modified in various ways without departing from the gist of the present disclosure. It should be noted that the advantageous effect described in the present specification is merely illustrative and not limitative, and there may be other advantageous effects.

REFERENCE SIGNS LIST

11 Mobile object control system, 12 Autonomous mobile robot, 13 Processing apparatus, 14 Sensor module, 21 Input section, 22 Computation section, 23 Driving section, 24 Display section, 31 Laser ranging apparatus, 32 RGB camera, 33 Stereo camera, 34 Inertial measurement apparatus, 41 CPU, 42 GPU, 43 Auxiliary storage apparatus, 44 Storage apparatus, 51 Motor control circuits, 52 Drive motors, 53 Encoders, 61 Output apparatuses, 71 Housing, 72 Mecanum wheels

The invention claimed is:

1. A mobile object control apparatus, comprising:
at least one processor configured to:
decide a degree of relation between a mobile object and a surrounding individual present in a vicinity of the mobile object, wherein the mobile object comprises a housing;
set a travel mode of the mobile object and a process of a representation of a travel direction of the mobile object based on the degree of relation; and
control a drive of the mobile object based on the set travel mode, wherein the drive of the mobile object is controlled such that a direction of an orientation of the housing of the mobile object is one of changed or remains unchanged, with a change in the travel direction of the mobile object.

2. The mobile object control apparatus of claim 1, wherein, in a case where the mobile object moves together with the surrounding individual, the at least one processor is further configured to control the drive of the mobile object such that the direction of the orientation of the housing of the mobile object changes with the change in the travel direction of the mobile object.

3. The mobile object control apparatus of claim 2, wherein the at least one processor is further configured to:
control the representation of the travel direction of the mobile object; and
restrict a representation of the change in the travel direction of the mobile object.

4. The mobile object control apparatus of claim 2, wherein the at least one processor is further configured to restrict the representation of the travel direction of the mobile object and the representation of the change in the travel direction of the mobile object.

5. The mobile object control apparatus of claim 1, wherein, in a case where, the mobile object does not move together with the surrounding individual and the surrounding individual is able to visually recognize the mobile object, the at least one processor is further configured to control the representation of the travel direction of the mobile object and a representation of the change of the travel direction of the mobile object, based on the change in the travel direction of the mobile object.

6. The mobile object control apparatus of claim 5, wherein the at least one processor is further configured to control the drive of the mobile object such that the direction of the orientation of the housing of the mobile object remains unchanged with the change in the travel direction of the mobile object.

7. The mobile object control apparatus of claim 5, wherein the at least one processor is further configured to control the drive of the mobile object such that the direction of the orientation of the housing of the mobile object changes with the change in the travel direction of the mobile object.

8. The mobile object control apparatus of claim 1, wherein, in a case where the mobile object does not move together with the surrounding individual and the surrounding individual that is able to visually recognize the mobile object is absent, the at least one processor is further configured to:
restrict the representation of the travel direction of the mobile object and a representation of the change of the travel direction of the mobile object, based on the change in the travel direction of the mobile object; and
change the direction of the orientation of the housing of the mobile object with the change in the travel direction of the mobile object.

9. The mobile object control apparatus of claim 1, wherein the at least one processor is further configured to control a display device to display the representation of the travel direction of the mobile object over an entire perimeter of side faces of the housing of the mobile object.

10. A mobile object control method, comprising:
deciding a degree of relation between a mobile object and an individual present in a vicinity of the mobile object, wherein the mobile object comprises a housing;
setting a travel mode of the mobile object and a process of a representation of a travel direction of the mobile object based on the degree of relation; and
controlling a drive of the mobile object based on the set travel mode, wherein the drive of the mobile object is controlled such that a direction of an orientation of the housing of the mobile object is one of changed or remains unchanged, with a change in the travel direction of the mobile object.

11. A non-transitory computer-readable medium having stored thereon computer-executable instructions, which when executed by a computer, cause the computer to execute operations comprising:
deciding a degree of relation between a mobile object and an individual present in a vicinity of the mobile object, wherein the mobile object comprises a housing;
setting a travel mode of the mobile object and a process of a representation of a travel direction of the mobile object based on the degree of relation; and
controlling a drive of the mobile object based on the set travel mode, wherein the drive of the mobile object is controlled such that a direction of an orientation of the housing of the mobile object is one of changed or remains unchanged, with a change in the travel direction of the mobile object.

* * * * *